11-6-73 XR 3,770,940

United States Patent [19]

Harr

[11] 3,770,940

[45] Nov. 6, 1973

[54] OPTICAL BAR CODING SCANNING APPARATUS

[75] Inventor: Jerome Danforth Harr, San Jose, Calif.

[73] Assignee: International Business Machines Corporation, Armonk, N.Y.

[22] Filed: Nov. 12, 1971

[21] Appl. No.: 198,331

[52] U.S. Cl. 235/61.11 E, 235/61.11 F, 235/61.12 N, 250/219 RG, 250/203, 340/146.3 H, 340/146.3 MA

[51] Int. Cl. G06k 7/14, G06k 9/13, G01n 21/30, G06k 19/06

[58] Field of Search ............... 235/61.11 E, 61.11 F, 235/61.12 N; 340/146.3 MA, 146.3 H, 146.3 F; 250/219 RG, 211 J, 203, 219 DR, 233

[56] References Cited

UNITED STATES PATENTS

| | | | |
|---|---|---|---|
| 3,522,437 | 9/1970 | Bargh | 340/146.3 F |
| 3,453,596 | 7/1969 | Hawkins | 340/146.3 F |
| 3,497,704 | 2/1970 | Holmes | 250/233 |
| 2,568,543 | 9/1951 | Goldsmith | 250/219 DR |
| 3,255,437 | 6/1966 | Singer | 340/146.3 MA |
| 3,506,837 | 4/1970 | Majima | 340/146.3 MA |
| 3,061,730 | 10/1962 | Jankowitz | 250/203 |
| 3,636,317 | 1/1972 | Torrey | 235/61.12 N |
| 3,465,130 | 9/1969 | Beltz | 235/61.11 E |
| 3,596,063 | 7/1971 | Curtis | 235/61.11 F |
| 3,414,731 | 12/1968 | Sperry | 250/219 D |
| 3,643,068 | 2/1972 | Mohan | 235/61.11 E |
| 3,596,060 | 7/1971 | Tibbals | 235/61.11 E |
| 3,553,437 | 1/1971 | Boothroyd | 235/61.11 E |
| 3,418,456 | 12/1968 | Hamisch | 255/61.11 E |
| 3,246,126 | 4/1966 | Schlieben | 235/61.11 E |

*Primary Examiner*—Maynard R. Wilbur
*Assistant Examiner*—Robert M. Kilgore
*Attorney*—George E. Roush et al.

[57] ABSTRACT

The scanning of documents bearing optical bar coding, particularly with hand-held scanning apparatus, is enhanced by an optical system effecting an elongated aperture substantially parallel to the bars without constriction as to the orientation of the apparatus. Corelated configurations of light sources, light sensitive devices, aperture plates and/or prisms are arranged with one or more effectively rotating under control of electronic circuitry for viewing the bars at a multiple of angular positions is disclosed. Preferably a photosensitive diode arrangement of substantially circular configuration is divided into a multiple of radially extending sectors isolated from each other, and diametrically collinear sectors are connected together as sector-couples. Light from the document striking the array of sector-couples produces a maximum on all sector-couples scanning the background and a minimum on one sector-couple or on at least a few sector-couples scanning bars against the background. Electronic circuitry determines the sector-couple having the minimum response and selects that couple for the completion of the scanning operation or until disorientation dictates another selection. Another embodiment comprises a circular photosensitive section insulated from the sectors and located centrally of the sector couples. In this embodiment the photosensitive section is connected to the chosen sector couple for improved resolution. Electronic multiplexing circuitry, signal peak predicting circuitry, rate of rise comparing circuitry, single sector-couple selecting circuitry and other pertinent electronic circuitry are described.

43 Claims, 39 Drawing Figures

*INVENTOR*
JEROME D. HARR

*BY* George E. Roush
ATTORNEY

KEY TO FIG.34

OPTICAL BAR CODING SCANNING APPARATUS

The invention stems from those endeavors from which the inventions disclosed and claimed in the co-pending U.S. Pat. applications, Ser. No. 31,959 of Ernie George Nassimbene filed on the 27th day of Apr. 1970 for "Retrospective Pulse Modulation and Apparatus Therefor," and thereafter issued on the 2nd day of Jan., 1973, as U.S. Pat. No. 3,708,748; Ser. No. 131,234 of Thomas Frank O'Rourke filed on the 5th day of Apr. 1971 for "RPM Coding and Decoding Apparatus Therefor," Ser. No. 158,466 of David Harwood McMurtry filed on the 30th day of June, 1971 for "Hand Probe for Manually Operated Scanning System," and thereafter issued on the 10th day of Apr. 1973, as U.S. Pat. No. 3,727,030; Ser. No. 223,555 of Jerome Danforth Harr and David Harwood McMurtry filed on the 4th day of Feb., 1972, for "Hand Held Probe for Manually Read Optical Scanning System."

The invention relates to optical scanning apparatus for sensing information recorded in a series of vertical lines or bars substantially parallel to each other, and it particularly pertains to hand-held optical scanning apparatus and/or machine scanning apparatus of extremely loose tolerances in either or both the machine and/or the recording of the bars on the document being scanned.

In optical mark scanning apparatus, the size and shape of the photosensitive area effective in sensing the information has a large effect on the reliability and the usability of the system. If the effective photosensitive area is a long, narrow rectangle, the sensing area is large and a large signal-to-noise ratio obtains. However, that rectangular area must be aligned with the marks to be sensed. This is a difficult task for the operator of a manual scanning apparatus and the same problems are present to a degree in machine scanning apparatus. Photosensitive devices with circular configurations have been suggested. These configurations are free from from orientation problems but the signal-to-noise ratio suffers due to the small area and reliability is likewise low.

The state of the prior art with respect to these and allied problems is reflected in the following U.S. Pat. Nos.:

| | | | |
|---|---|---|---|
| 3,229,075 | 1/1966 | Palti | 235–61.11 |
| 3,327,584 | 6/1967 | Kissinger | 88–14 |
| 3,414,731 | 12/1968 | Sperry | 250–219 |

and the technical literature: R. E. Bonner, "Pattern Recognition System Using Controllable Non-uniform Raster," IBM Technical Disclosure Bulletin, Vol. 6, No. 9, Feb. 1964, p. 85; M. Trauring "Automatic Comparison of Finger-Ridge Patterns," Nature, Vol. 197, Mar. 9, 1963, pp. 938–940

The objects of the invention indirectly referred to hereinbefore and those that will appear as the description progresses obtain in an optical bar code scanning system effecting a rotatable elongated optical pupil aligned with the bars at the document in optimum angular relationship for sensing reflection and/or absorption of light therefrom.

A basic concept of the invention comprises an optical system providing a rotating optical pupil resulting from an elongated optical aperture stop which is dimensionally proportional to the bars of the coding. Light from a suitable source is transmitted to a suitable photosensitive device by reflection from the document bearing printed coding bars. In one embodiment, a rotating aperture disk is interposed between the light source and the document and in another the rotating disk is interposed between the photosensitive device and the document being scanned by passing the optical system relatively along the coding orthagonally of the bars. In other embodiments the aperture disk is fixed and rotation of the pupil is effected by a mechanically rotating Dove prism interposed in the optical system. Still other embodiments comprise an optical fiber bundle having one end of elongated configuration constituting the optical aperture stop and the other end in any, but preferably in a circular, configuration for coupling to the source of light or the photosensitive device. This optical fiber bundle is rotated about an axis normal to the plane of and centrally of the elongated aperture stop.

Suitable means for mechanically rotating the mechanisms are known and readily available and the rotation is synchronized in the scanning operation so that the optimum alignment of the effective or actual aperture obtains at the times the bar coding is sensed during the scanning operation. Suitable means for such synchronized operation are linear and readily available.

Rotation of an effective optical pupil is obtained in an alternative embodiment wherein an optical fiber bundle is separated in substantially radially extending sectors at the larger end and a multiple of light sources such as light emitting diodes, are sequentially switched on to illuminate the document in collinear pairs of sectors. Thus electric and/or optical rotation is effected, and much higher rates of rotation are afforded.

In still another embodiment the light source is shaped to constitute the aperture stop (as in the lens of some optical systems for the simple photographic cameras). Such a source comprises a sectored light emitting device of the nature of a semiconductor. Diametrically collinear sectors are energized sequentially for light wavelength emission. Much faster rotation of the pupil is possible with the latter structures but the quantity of light available with conventional materials is not as great as is desired.

Combinations and/or variations of the above-described arrangements are contemplated for many possible applications and requirements.

In the preferred embodiments a sectored photosensitive device is arranged in an optical scanning system like those described above. Conventional materials and methods of manufacture provide a highly satisfactory device at reasonable cost.

The sectored photosensitive device according to the invention is substantially fixed from the rotational standpoint and the diametrically collinear sectors of configuration constituting the aperture stop are connected together electrically to form sector-couples. In an alternate embodiment of this device a central photosensitive section of the array is electrically isolated from the sectors but functionally coupled in operation for improving the operation of one or all sector-couples.

In a basic mode of operation the photosensitive sector-couple most nearly aligned with the bars is selected for sensing in normal manner with or without inclusion of the central photosensitive section. It is a distinct advantage of the structure of the invention, however, that the other sector-couples, especially those immediately adjoining the most nearly aligned sector-couple be continuously monitored and in the event that a different sector-couple become more nearly aligned, as might be due to inadvertent rotation of hand held apparatus, that different sector-couple be substituted for the remainder of the scan or that portion thereof during which the different sector-couple is most nearly aligned.

According to the invention, electronic circuitry is arranged for determining the alignment of at least the most nearly aligned sector-couple and for switching sector couples automatically. A simple electronic arrangement comprises an analog OR gating circuit connecting all sector-couples to an operational amplifying circuit. A more elaborate embodiment of this circuit arrangement comprises a peak signal clamping circuit and a peak signal storing circuit connected in cascade between each sector-couple and a multiple transistor selection gating circuit in which only the transistor connected to the storage circuit having the highest peak value conducts.

More complex circuitry according to the invention comprises parallel and serial multiplexing of sector-couples in a continuing sampling mode of operation. These arrangements continuously compare the output of a selected sector-couple with outputs of all other sector-couples and automatically switch to the most nearly aligned sector-couple. Efficient arrangements for different applications are based on slope detection circuitry determining the rate-of-rise of input voltage waves for switching from one sector-couple to a different one.

In order that full advantage of the invention may be obtained in practice, preferred embodiemnts thereof, given by way of examples only, are described in detail hereinafter with reference to the accompanying drawing, forming a part of the specification, and in which.

Figure 34A:
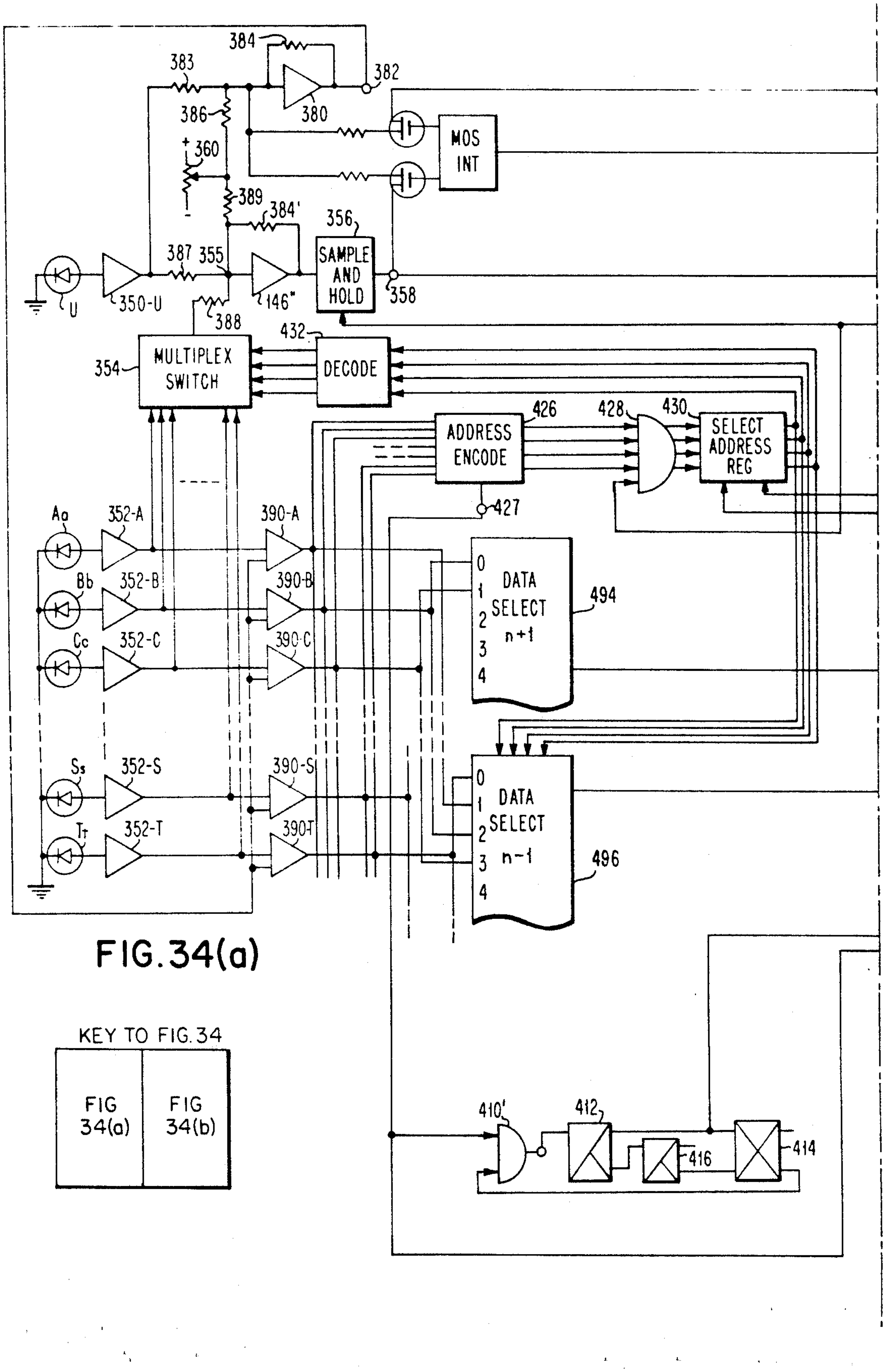
Figure 34B:
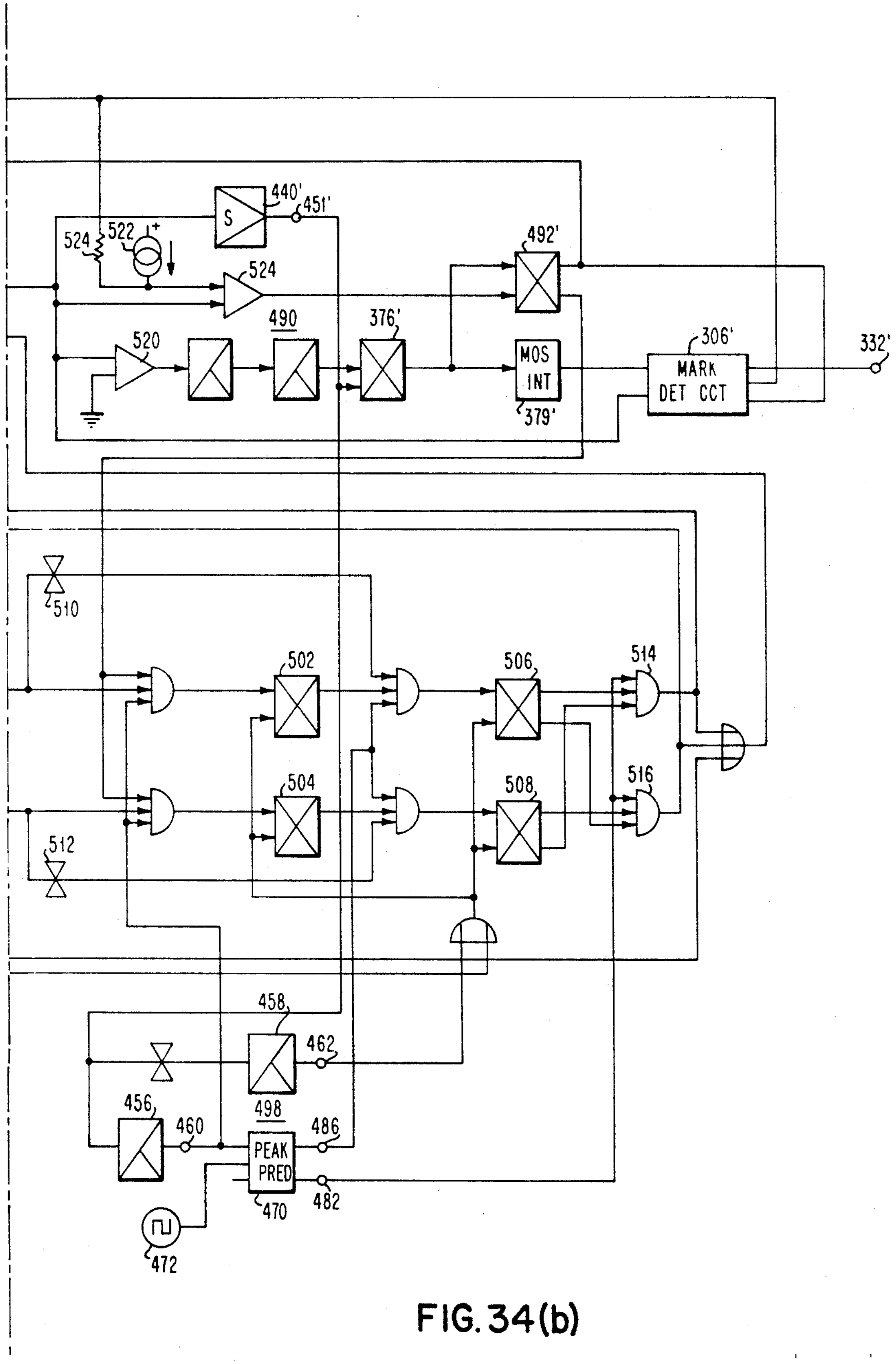
Figure 35:
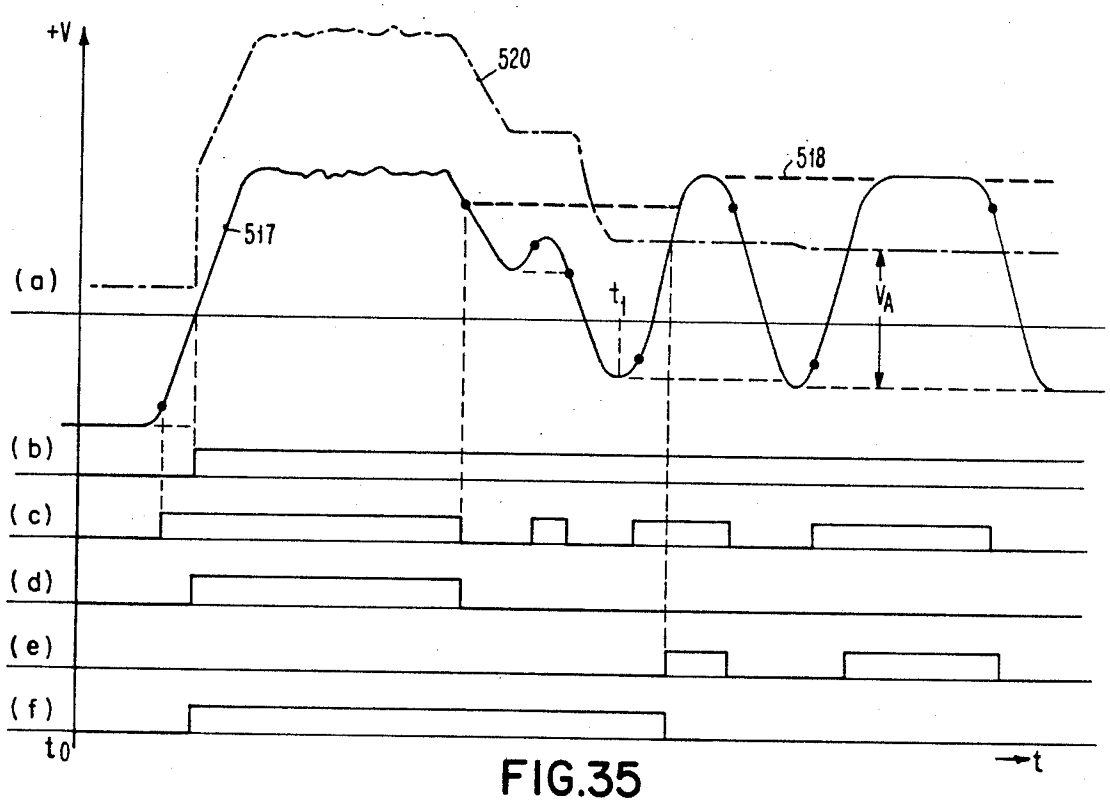
Figure 37:
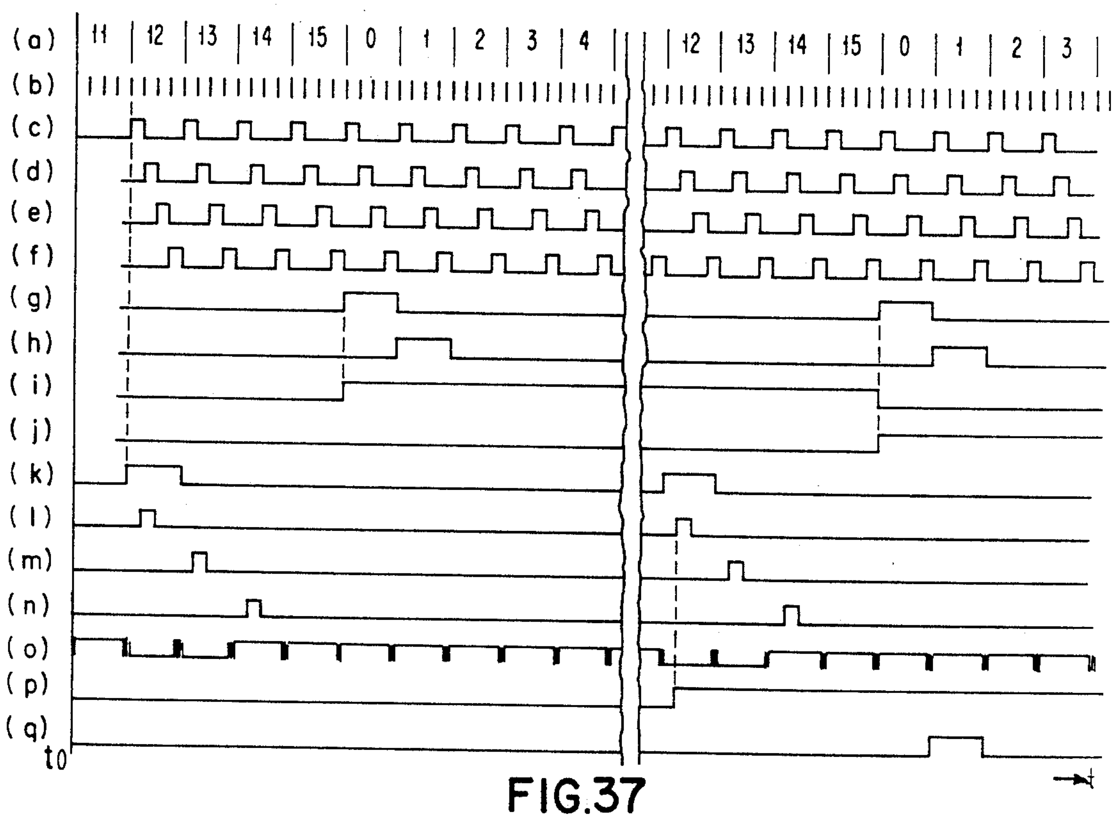
Figure 36A:
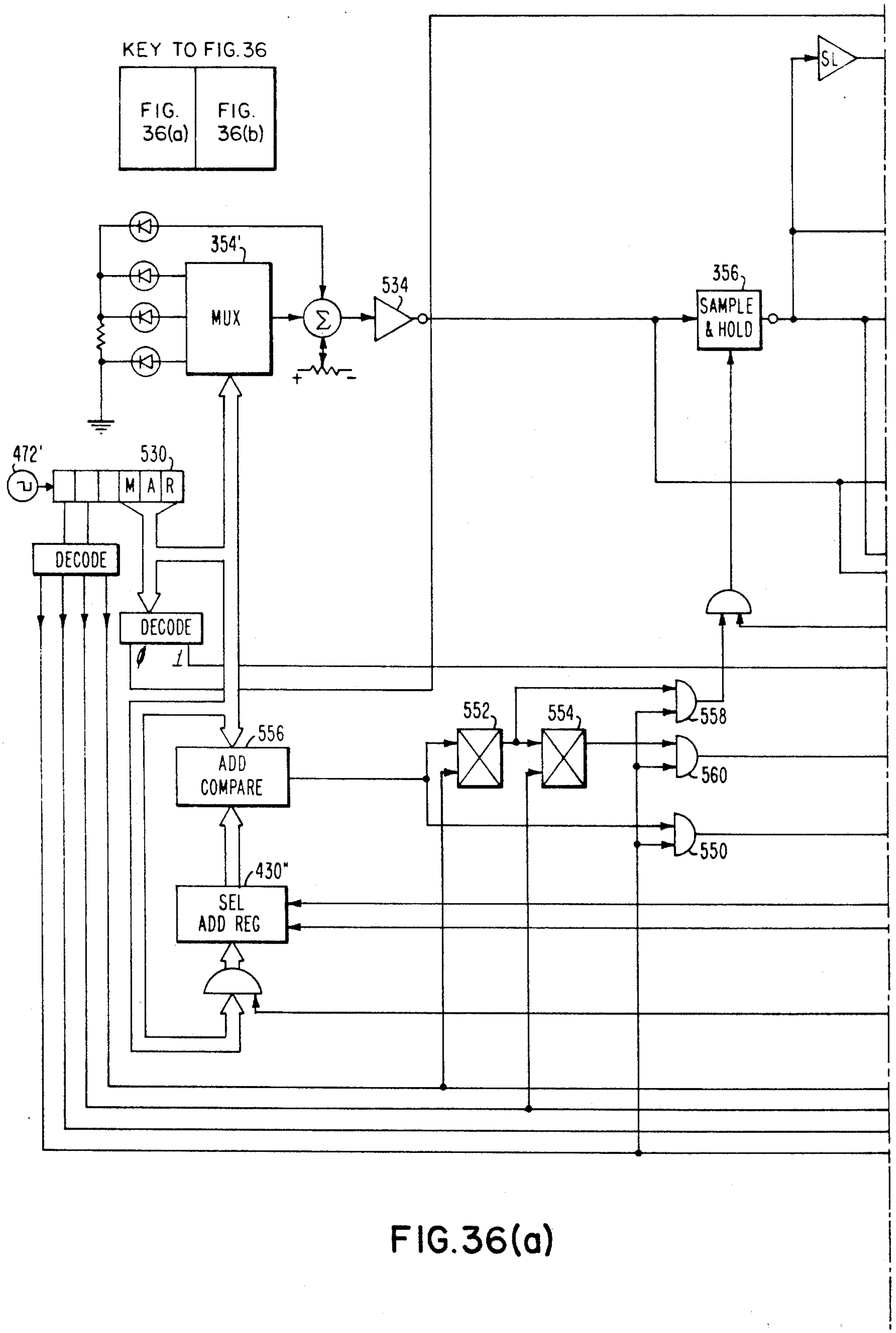
Figure 36B:
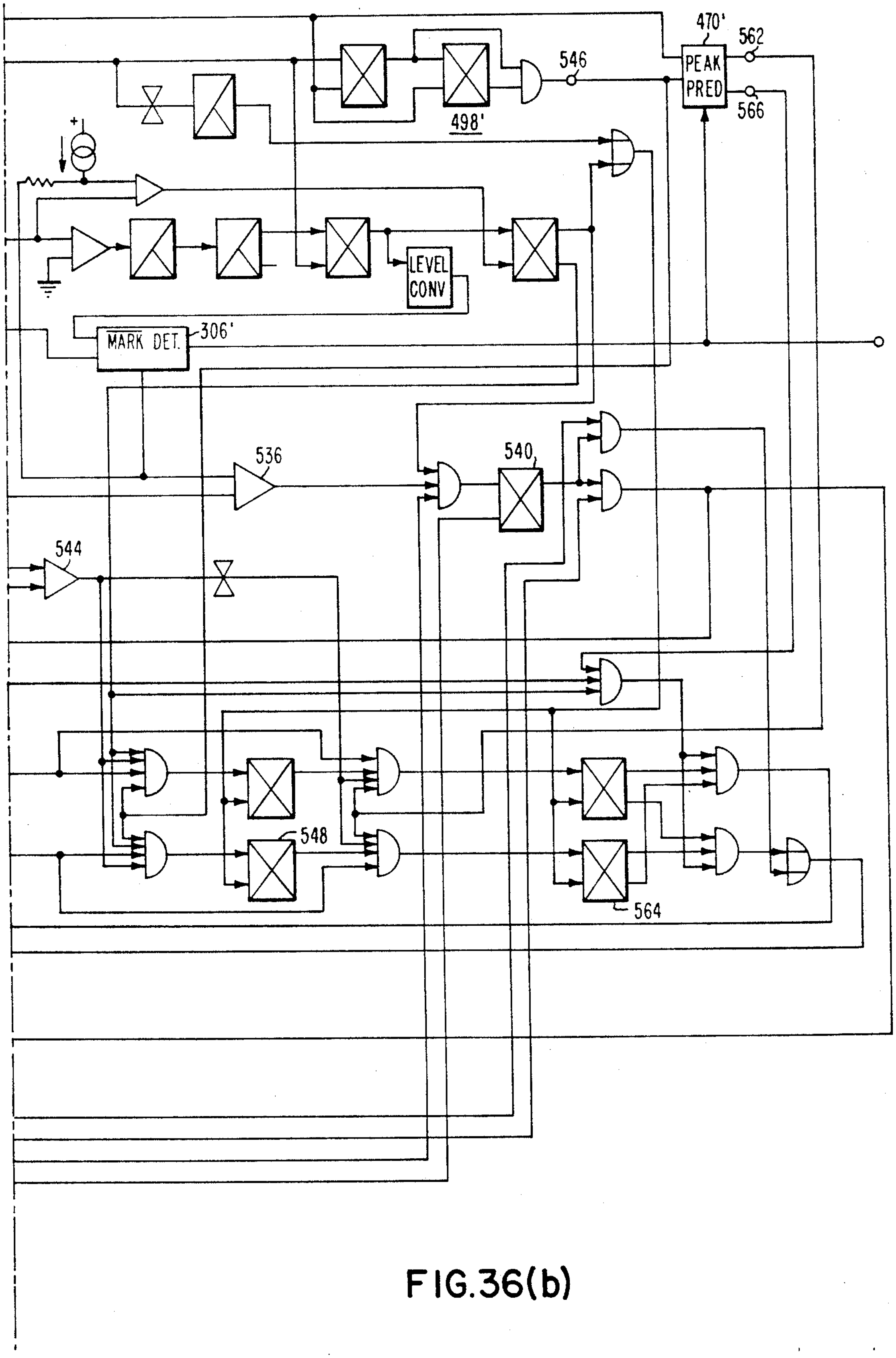

FIG. 34--sections (a) and (b) being taken together--is a functional diagram of further circuitry for use with the photosensitive array according to the invention;

FIG. 35 is a graphical representation of waveforms obtained with the circuitry of FIG. 34;

FIG. 36—sections (a) and (b) being taken together—is a functional diagram of another multiplex system for use with a photosensitive array according to the invention; and FIG. 37 is a graphical representation of waveforms obtained with the circuitry of FIG. 36.

Figure 1:
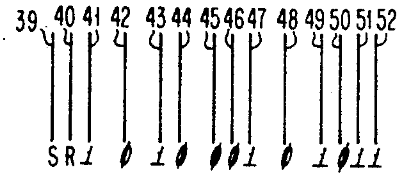
FIGS. 1 and 2 are graphical representations of two forms of optical bar coding for which apparatus according to the invention is intended to sense.
Figure 2:
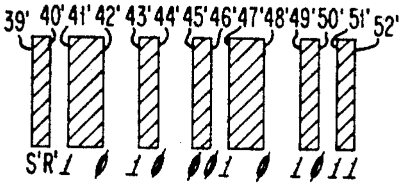

Two examples of bar coding for which the scanning apparatus according to the invention was developed are shown in FIGS. 1 and 2, but it should be clearly understood that the apparatus according to the invention is equally adaptable to almost all, if not all, other bar coding arrangements, since those skilled in the art will readily adapt the teachings herein to the particular bar coding scheme at hand. FIG. 1 illustrates the underlying principle of RPM (retrospective pulse modulation) bar coding as described and claimed in the copending U.S. Pat. application Ser. No. 31,959 hereinbefore mentioned. Information in the form of a 12 order binary number, 101000101011 is coded in this general example. A series of parallel lines 39–52 are arranged for conversion into a train of narrow electric pulses by photosensitive apparatus according to the invention. The data is established at time intervals proportional to the spacing between the lines 39–52. A start line or bar 39 is followed at a predetermined spacing by a reference bar 40 for initiating the retrospective coding. The first information manifesting bar 41 follows a reference 40 by a spacing substantially equal to the spacing between the start bar 39 and the reference bar 40 to manifest a binary unit; obviously a binary naught might better be manifested by this arrangement depending upon the situation facing the designer. The following bar 42 is arranged on the former basis to denote a binary naught by spacing the bar 42 substantially twice the distance from the preceding bar 41 as that bar follows the reference bar 40. The information is carried essentially by the spacing between bars. Accordingly there is illustrated an example of each of the possibilities of data manifestation in basic binary digit RPM coding where the immediate preceding spacing is reflected in the spacing of the digit under consideration.

In FIG. 2 the same binary data is manifested by the transistions between highly contrasted white and black areas. Apparatus according to the invention is passed over this transition-significant form of RPM bar coding from a point before the starting edge 39' to a point beyond the final edge 52'. An electric pulse signal is developed at each transition from white to black and again from black to white. Preferably a differentiating process is involved in either case. Each differential pulse is significant with respect to data in the transition significant form whereas alternate pulses are not in the basic example. This difference is of immediate importance in increasing the density of the coded data and in the elimination of superfluous pulses in the data signal which may interfere as though spurious. In the transition significant arrangement it is necessary to add an "inter-character gap" of one bit space to separate the last dark bit space from the first dark bit space of the succeeding character.

Figure 3:
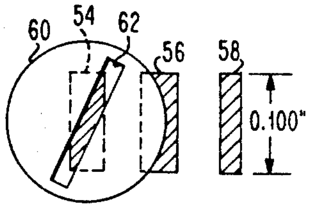
FIG. 3 illustrates the use of a rotating elongated aperture stop in an optical system for scanning bar coding.

FIG. 3 illustrates the basic problem. Three bars 54, 56, and 58 in typical configuration are recorded on a document. An aperture stop plate 60 having an elongated rectangular aperture 62 forms a basic part of the scanning apparatus. The aperture 62 is proportional to the bars to be sensed. In this figure it is assumed that the optical pupil and the aperture stop are identical. It must be understood, however, that optical magnification or reduction may well be involved in the optical system of the overall apparatus. The plate 60 is used in this illustration for better contrasting the pupil from the bars and is shown skewed with respect to the bars 54–58 for emphasizing the difficulty with prior art arrangements. According to the invention, the aperture plate 60 is rotated at a predetermined rate of rotation much faster than the rate of scan. With such an arrangement there are two angles (180° apart) for each revolution at which the aperture 62 is on line in the same longitudinal direction as the bar 54. Ambient light will pass at all angles except those two particular angles, when the aperture is centered over a bar. The arrangement preferably is further disposed so that the photosensitive device is exposed to light passing through the aperture stop 62 only at those two particular angles plus or minus a small angular tolerance.

Figure 4:
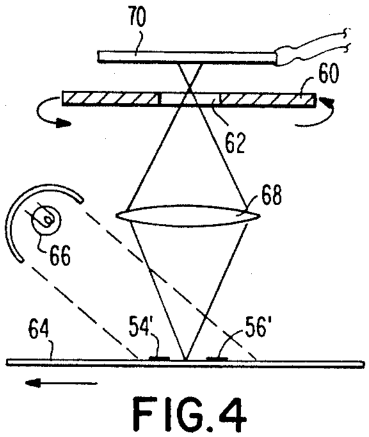
FIGS. 4–8 are schematic diagrams of fundamental optical bar coding scanning apparatus according to the invention.
Figure 5:
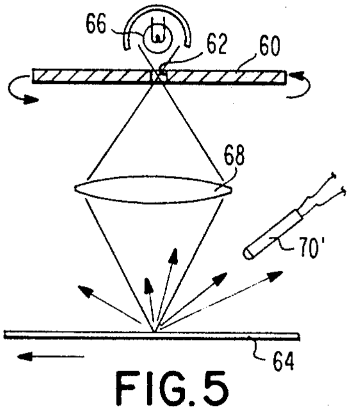
Figure 6:
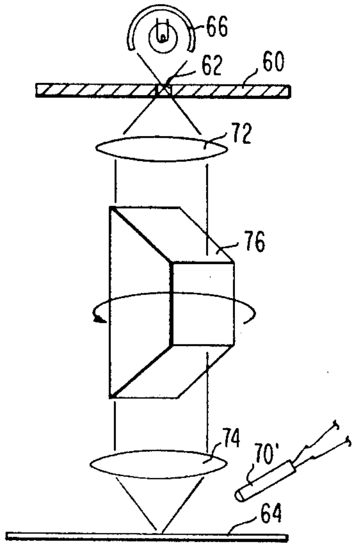
Figure 7:
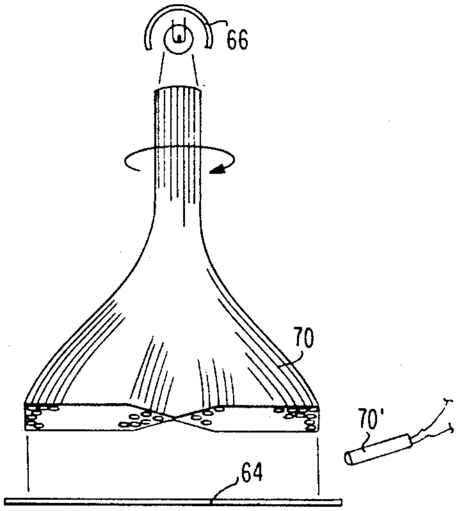

There are several embodiments of this basic concept. In the embodiment shown in FIG. 4. a document 64 is moved relatively slowly beneath the aperture stop plate 60 shown in cross section to expose the bars 54' and 56' illuminated by a light source 66 in an optical system also comprising a lens 68 and a photosensitive device 70. In this schematic showing means for rotating the aperture plate 60 and keying the response of the photosensitive device 70 are omitted in the interest of clarity. Known arrangements will be immediately suggested to those skilled in the art for the application at hand. A dual of the latter arrangement is shown in FIG. 5 wherein the light source 66 is arranged to illuminate the aperture stop 62 and a photosensitive device 70 is arranged to receive light reflected from the background of and the marks on the document 64. A slightly different arrangement is shown in FIG. 6 wherein the aperture plate 60 is fixed and light from a source 66 is imaged onto the document 64 by means of a pair of lenses 72, 74. Rotation of the pupil at the document 64 is achieved by a Dove prism 76 interposed between the lenses 72, 74 and rotated in synchronism with the keying system. Another embodiment having a mechanically rotating element is shown in FIG. 7. Here a bundle of optical fibers 70 are arranged to have a circular configuration at the end adjacent the light source 66 and a propeller-shaped configuration defining the aperture stop at the end adjacent the document 64. Again synchronizing the rotating means to the detection circuitry is contemplated as comprising conventional system components.

It will be obvious to those skilled in the art to employ the duals of the latter embodiments and to combine the duals directly or indirectly described in order to better the operation.

Figure 8:
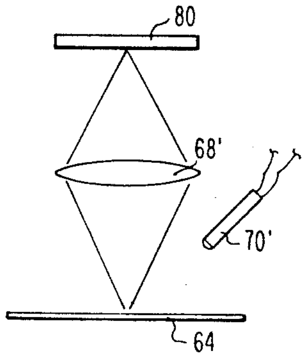

On most applications, the rotational speed desirable for the mechanical components as described would be considered excessive. For reading the bar code as shown in FIG. 2, at a demsity of 10 alphameric characters per inch at a scanning rate of 100 inches per second, it would be necessary to have an aperture rotation of 180° at least once every 16 microseconds in order to recover the information. Electronic means of achieving the aperture rotation are contemplated according to the invention in at least two forms. The schematic illustration of FIG. 8 illustrates a system in which a light source 80 is sectored into narrow substantially triangular segments the outlines of which define the aperture stop. These segements are energized in diametrically collinear pairs for illuminating the document 64 in essentially the same manner as the arrangement of FIG. 7. The sectored light source 80 may be an array of light emitting diodes of differing diameters from the center of the device and interconnected groups forming the pie-shaped sectors described. At the present state of the art, light emitting diode devices are readily formed in pie-shaped sector configuration. Such a configuration is suggested by a component 90 in FIG. 9. An alternative embodiment is contemplated in the form of an optical fiber bundle of circular cross-section at the ends separated into a number of substantially radially extending sectors each pair similar to the bundle 70 in FIG. 7 at the larger end and a multiple of light sources such as light emitting diodes are sequentially switched on to illuminate the document in collinear pairs of sectors. Thus rotation is effected at electric and/or optic[al] rates.

Figure 9:
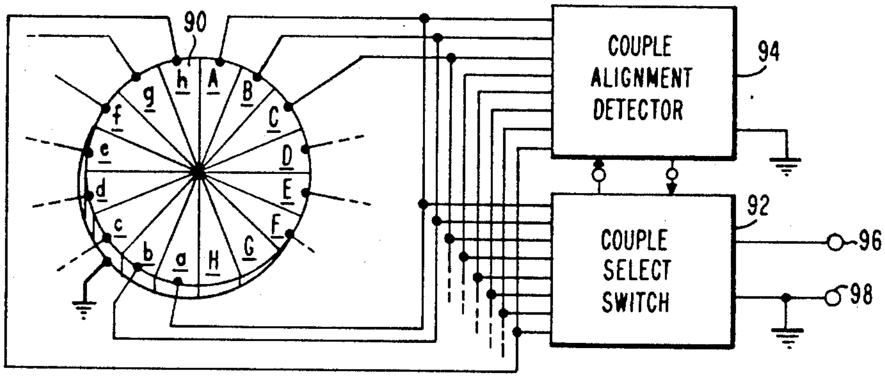
FIG. 9 is a schematic functional diagram of electronic bar coding scanning apparatus according to the invention.

The component 90 in FIG. 9, while it also serves to illustrate the configuration of a sectored light source, is actually that of a sectored photosensitive device. The photoresponsive device 90 as shown is a substantially circular photocell arrangement having 16 equal sectors A, B, . . . G, H and *a*, *b*, . . . *g*, and *h* laid down on a substrate in conventional manner. No further description will be given of the construction of such a device as the fabrication in and of itself is not a part of the invention. A backing electrode is common to all of the sectors and is arranged with an electric lead for connection to a point of reference potential which is shown in this illustration a being at ground potential. The sectors are insulated from each other and are connected in diametrically collinear pairs or couples as A*a*, B*b* . . . H*h*. The sector-couples are connected to a couple-selecting switching circuit arrangement 92 and also to a couple-alignment detecting circuit arrangment 94. The sector-couples are selected sequentially, for example, at the beginining of a scanning operation and the couple alighment detecting circuit arrangment 94 determines which couple receives the minimum amount of light when centered over a mark, (or maximum light when centered over clear space) as this indicates the closest sector-couple aligned with the marks. The couple alignment detector circuit arrangement then fixes the couple-selecting switch on that particular sector-couple for operation for the remainder of the scan and light output levels are delivered at output terminals 96 and 98. Arrangements for operating one or more of the components in parallel also will be described hereinafter.

Figure 10:
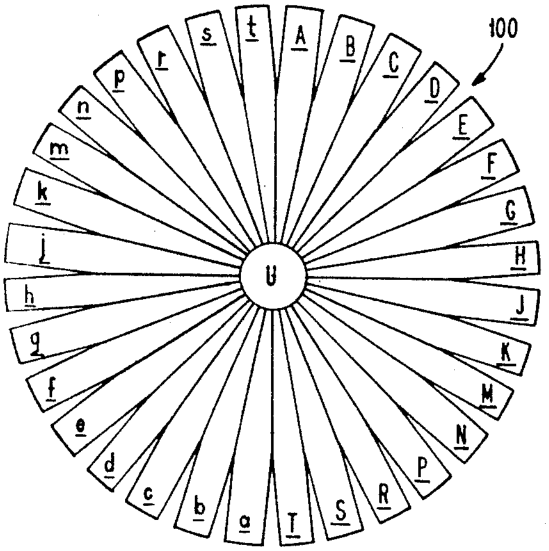
FIGS. 10 and 11 are illustrations of a photosensitive device according to the invention.
Figure 11:
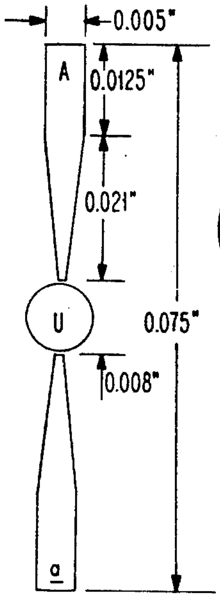

The layout diagram of sector photosensitive device as actually constructed is shown in FIG. 10. The device 100 comprises 32 sectors arranged at angles of approximately 11.25°. In this arrangement there is also a central photosensitive section U which is insulated from all of the other sections A–*h*. One sector couple Aa and the central section U are shown separated from the remainder of the array in FIG. 11. The sector couples are electronically time division multiplexed, or otherwise operated, so that the result is a scanner which acts very much like the mechanical scanners described hereinbefore. Other configurations of sector-couples in arrays are shown and described in a later filed copending U.S. patent application, Ser. No. 225,895, filed on the 14th day of Feb., 1972, of David Harwood McMurtry for "Optical Bar Coding Scanning Device."

Figure 12:
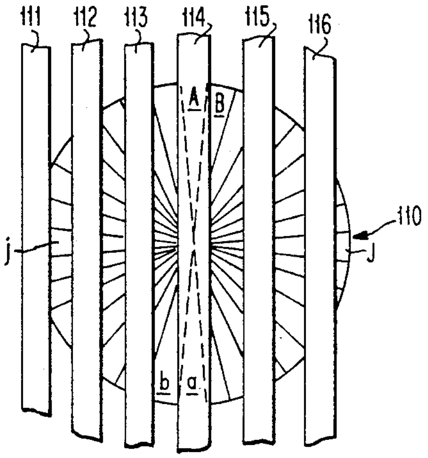
FIG. 12 depicts a sectored photosensitive device according to the invention as optically imaged onto printed coding bars of a document.

FIg. 12 shows a sectored photosensitive device 110 with the marks 111 . . . 116 of a document optically imaged thereon. As shown, the photosensitive device 110 is centered on the central mark 114. The sector-couple A*a* receives the minimum amount of light, while the sector-couple J*j* cross-angled to the axis of the marks receives an amount of light which is an average in the direction of scan and which depends on the average mark-to-space ratio of the three or four marks in each direction from the center.

Figure 13:
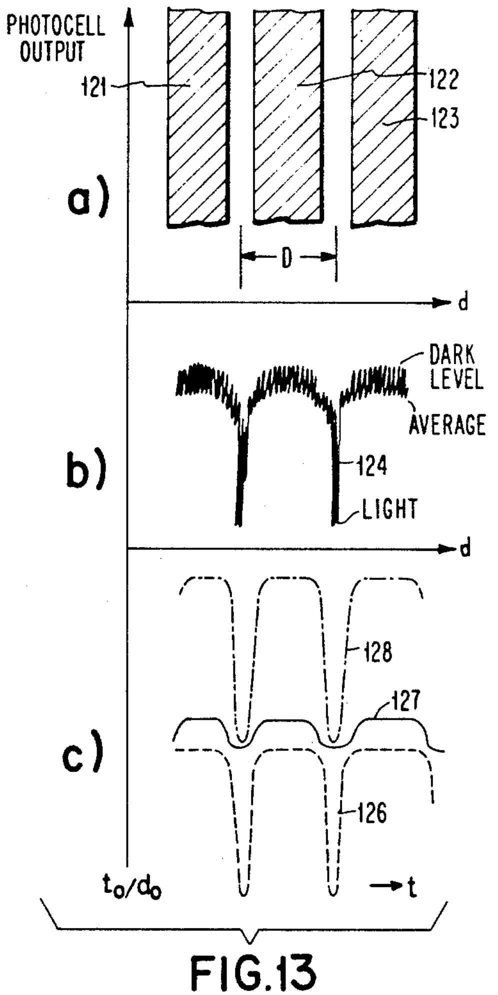
FIGS. 13 and 14 are graphical representations of two different sets of bars and electric waveforms resulting from scanning these bars.
Figure 14:
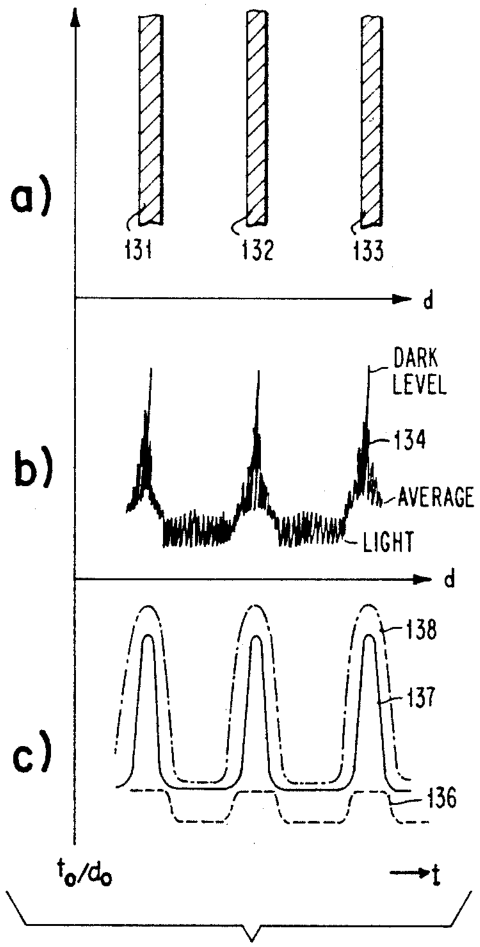
Figure 15:
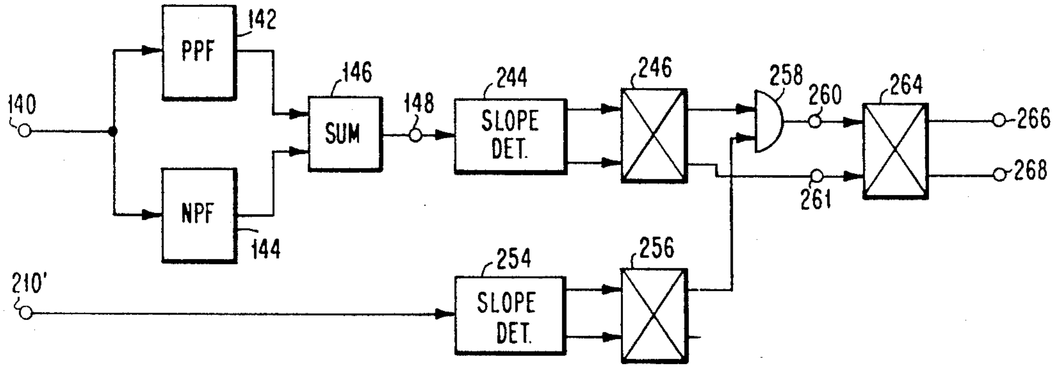
FIG. 15 is a functional diagram of circuitry for analyzing the electric waves obtained from a photosensitive device according to the invention.

FIGS. 13 and 14 show two different sets of bars and the electric waveforms resulting from scanning these bars as the photosensitive array is "rotating" rapidly as it is moved along. Relatively wide bars 121, 122 and 123 produce a trace 124. An analysis of this trace 124 results in one wave 126 representing negative peak voltage, a wave 127 representing positive peak voltage and wave 128 representing the sum of these peak voltage waves. Relatively narrow bars 131, 132 and 133 have the same repetition rate spacing developed in a trace 134 and corresponding analytical waves 136, 137 and 138. From these curves it can be seen that the difference in output from the dark level to the average level in FIG. 13(b) is much smaller than the output level from the average to the light level, while the converse is true in FIG. 14(b). Circuitry for producing these analytical waves is shown in FIG. 15. The output of the scanning detecting device is applied at input terminals 140. A positive peak follower circuit 142 and a negative peak follower circuit 144 are connected to the input termals 140 for producing the peak level voltages which are in turn applied to a summing circuit 146 at the output terminals 148 of which the algebraic sum of the instantaneous amplitudes is obtained. The summed outputs of the peak follower circuits 142 and 144 contains all the information required to detect the bars and is of relatively constant amplitude as can be seen by examining curves 128 and 138 of FIG. 13(b) and FIG. 14(b).

Figure 16:
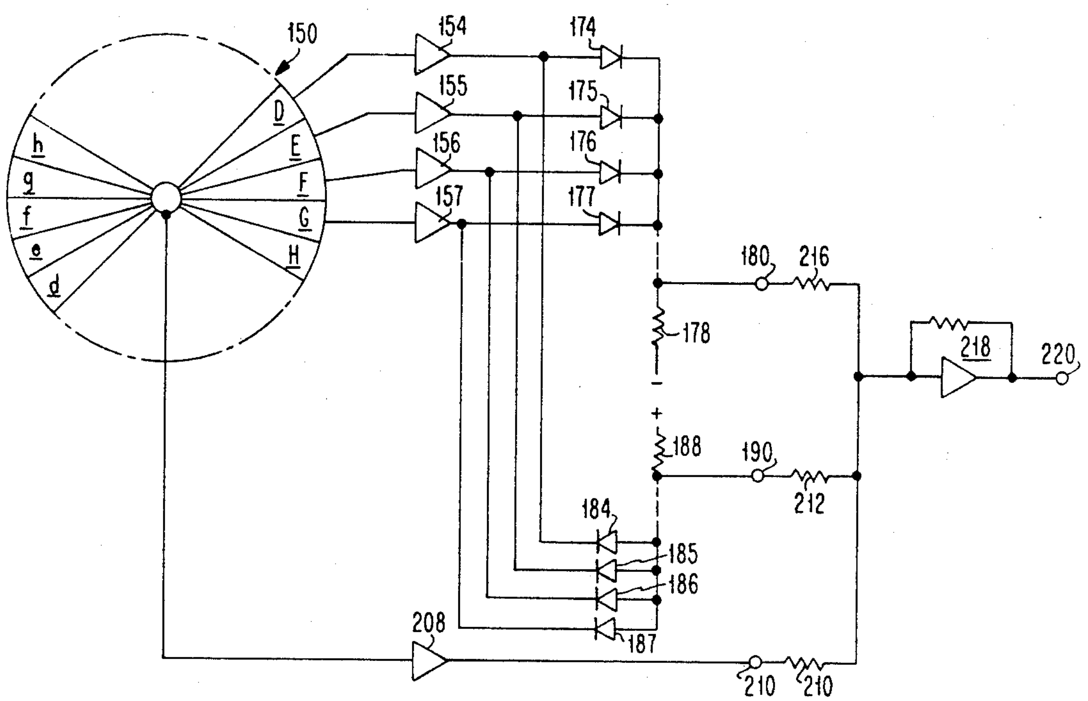
FIG. 16 is a schematic diagram of circuitry used with the photosensitive array according to the invention.
Figure 17:
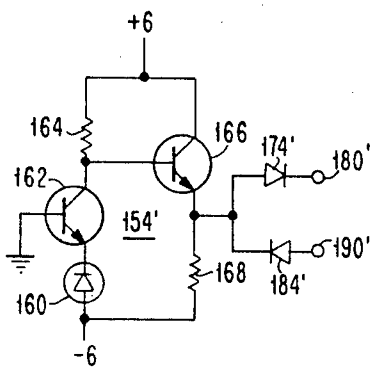
FIG. 17 is a schematic diagram of a photosensitive device amplifier according to the invention.

FIG. 16 illustrates circuitry for obtaining the peak outputs by operation of all of the photoresponsive sector-couples simultaneously. Only a few of the sector-couples of a sectored photosensitive device 150 are shown in the interest of clarity. In conventional photoresponsive devices the output voltages are usually not higher than the diode forward resistance drops; hence the use of amplifying circuits 154 . . . 157 is contemplated. An example of a suitable amplifying circuit 154' is shown in FIG. 17. A sector couple is represented by a photo diode 160 which is reversed-biased and operated as a current source. A transistor 162 and a load resistor 164 are connected in a common base amplifying circuit providing high output voltage and a following transistor 166 and associated emitter resistor 168 are arranged to provide a low impedance drive through the subsequent peak following circuits. Referring back to FIG. 16, the peak following circuits comprise diodes 174 . . . 177 a resistor 178 connected as shown to a positive peak output terminal 180 and oppositely poled diodes 184 . . . 187 and another resistor 188 connected as shown to negative peak value output terminals 190. The operation of circuit arrangement will be described on the basis of the voltages indicated on the drawing. Assuming that the outputs of the sector-couples are high compared to the forward voltage drops of the diodes, the positive peak follower output will be drawn up to the highest input voltage, that is 15 volts. Similarly the negative peak follower circuit output will follow the lowest sector-couple output which is shown as 5 volts. The advantage of this circuit arrangement is that the highest frequency of interest is now the same as the bandwidth of the photosensitive sector-couple rather than the several megaHertz required in a multiplexing scheme. Consequently the amplifying circuits are simpler and the noise level is lower. Another arrangement for obtaining a usable analog signal is simply to examine the output voltages of all sector-couples and determine which couple has the largest peak-to-peak signal swing. This couple is then the one which is most closely aligned with the bars. Circuitry is then arranged to switch this pair to the analog output terminals for bar detection and processing.

Figure 18:
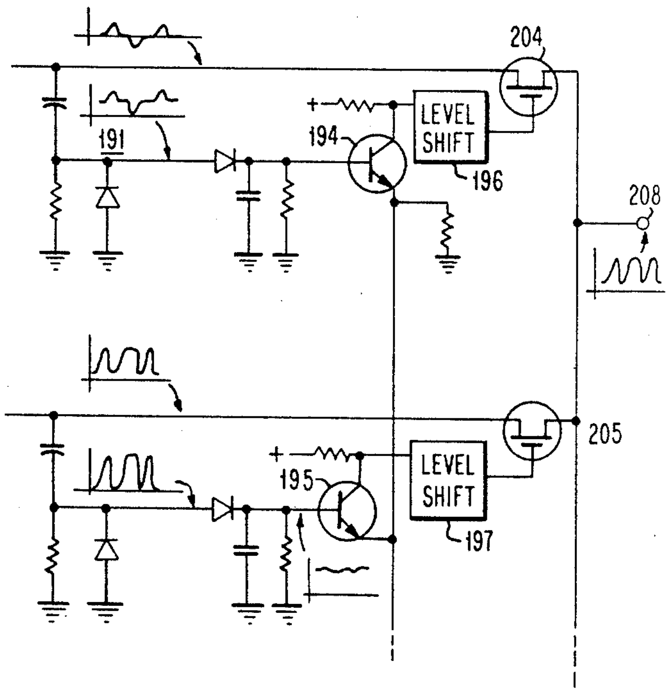
FIG. 18 is a schematic diagram of photosensitive device selection and gating circuitry.

Such an arrangement is shown in FIG. 18. After amplification, the photosensitive sector-couple signals are applied to peak clamping circuits 191 which clamp the most negative portion of the waveforms to a point of fixed reference potential, shown here as ground potential. Following this is a peak storing circuit 192 which develops a direct voltage output equal to the peak-to-peak signal swing from the input signal. The output of each peak storing circuit connected to the base of a transistor 194, 195 and so on. The emitter electrodes of all of the transistors are connected together. Whichever peak storing circuit has the highest output causes the associated transistor to conduct (all of the other transistors will remain blocked). The collector elecrodes of the transistors are connected (level shifting circuits 196 and 197 may be necessary.) to switching transistors 204 and 205 and so forth for connecting the photosensitive sector-couple having the highest output to the analog output terminals to 206.

Figure 19:
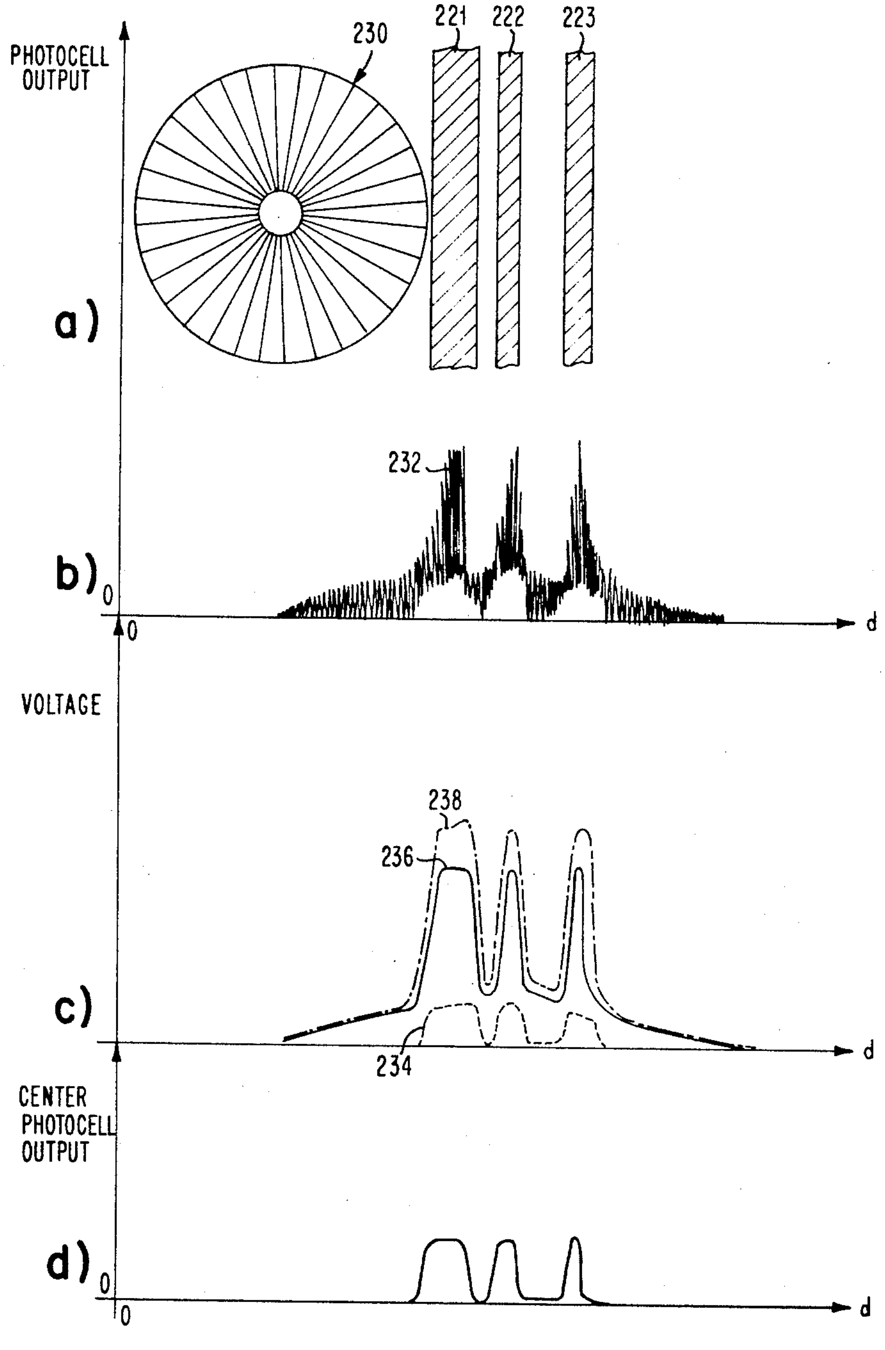
FIG. 19 is a graphical representation of a photosensitive array according to the invention, optical scanning marks, and waveforms resulting from the scanning of these marks.

As related hereinbefore a center photosensitive section offers advantages. A difficulty is encountered, however, whenever the center photosensitive section is approaching the group of data bars. In circuitry, as shown in FIG. 16 in the center section, is coupled through an amplifying circuit 208 to output terminals 210. These output terminals along with output terminals 180 and 190 coupled by means of resistors 212, 214 and 216 to a summing circuit 218 at the output terminals 220 of which the sums of all the components are provided. In such an arrangement, the output of the positive peak following circuit at the terminals 180 increases and consequently so does the sum output. This is shown in FIG. 19. At FIG. 19(a) three data bars 221, 222 and 223 are approached by a photosensitive scanning device 230 according to the invention. The corresponding trace 232 is shown in FIG. 19(b). From this figure it is seen that the leading edge of the first bit is inaccurately located using just the sum information. This difficulty appears whenever the average darkness over the photosensitive device changes faster than the darkness of the bars under the center of the photosensitive device. While this problem might be circumvented by always having marks present, this would mean that preceding and following valid data there would be continuous space for no code data (appearing whereever data is not practically represented). Many bar code arrangements involve a start character as the first character of data. In such arrangements the first mark in this character is made longer than the following space. This apparent stretching of the initial mark will have no effect on the data recovery. According to the invention the information provided by the center photosensitive section is arranged to herald the entry of the mark or bar into the array center. The output of the center photosensitive section is represented in FIG. 19(d).

Referring back to FIG. 15, there is shown a circuit which takes advantage of this information. The output of the peak summing circuit 146 at terminals 148 is applied to a slope detecting circuit 244. This slope detecting circuit 244 has one output terminal active during a positive going input and the other active during a negative going input. The two inputs would be complementary except for a built-in hysteresis which provides noise immunity for the circuit. An example of such a slope-detecting circuit will be given hereinafter.

An analysis of the trace 232 is shown in FIG. 19(c) wherein curves 234, 236, and 238 represent the negative peak output envelope, the positive peak envelope, and the sum of the two respectively in the same manner for th earlier examples.

The two outputs of the slope detecting circuit 244 are applied to the set and reset terminals of a latching bilateral reciproconductive circuit 246.

Because of the gross inconsistency with which the terminology relating to the many types of "multivibrators" and similar circuits is used, the less frequently but much more consistently used term "reciproconductive circuit" will be used hereinafter in the interest of clarity. As employed herein, the term "reciproconductive circuit" is construed to include all dual current flow path element (including vacuum tubes, transistors and other current flow controlling devices) regenerative circuit arrangements in which current flow alternates in one and then the other of those elements in response to applied triggering pulses. The term "free running multivibrator" is sometimes applied to the "astable reciproconductive circuit" which is one in which conduction continuously alternates between the elements after the application of a single triggering pulse (which may be merely a single electric impulse resulting from closing a switch for energizing the circuit). SUch a circuit oscillates continuously at a rate dependent on the time constants of various components of the circuit arrangement and/or the applied energizing voltage. The term "monostable reciproconductive circuit" will be used to indicate such a circuit as the time delay circuit in which a single trigger is applied to a single input terminal to trigger the reciproconductive circuit to the unstable or operating state once and return to the stable or idling state. This monostable version is sometimes called a "single-shot circuit" in the vernacular principally because of the erosion of the original term "flip-flop" and because it is shorter than the term "self-restoring flip-flop circuit" later used in an attempt to more clearly distinguish from the term "bistable flip-flop circuit" even more lately in vogue. "Bistable reciproconductive circuits" are divided into two basic circuits. One is the "bistable reciproconductive circuit" having two input terminals between which successive triggers must be alternately applied to switch from one stable state to the other, will be referred to as a "bilateral reciproconductive circuit." Conventionally these stable states are distinguished as "set" and "reset" states, the latter frequently being an idling state. This version is loosely called both a "flip-flop" and a "lockover circuit." The other is the "binary reciproconductive circuit" which has one input terminal to which triggering pulses are applied to alternate the state of conduction each time a pulse is applied. Another type of reciproconductive circuit comprises of several types frequently loosely referred to in the vernacular as "Schmitt triggers." They differ from the previously mentioned circuits in that primarily in response to changes in level and restore to the initial state when the reciprocating level drops. This type of circuit will be referred to as a "level triggering reciproconductive circuit" or as a "level-triggering circuit. Such level triggering circuits are excellent for resolving the evaluation of singles in binary fashion. When the signal level is sufficient to be recognized the level triggering flip-flop will switch to a state so indicating. These circuits exhibit an "hysteresis characteristic" which is an advantage in more clearly section output must be increasing in order to indicate distinguishing levels, such as obtained with light sensing apparatus, having intermediate values that reflect marginal operation; only the signal definitely desired for operation will switch the circuit designed for the applications and hold it until the signal level has dropped well below the trigger level.

The transition of the output of the reciproconductive circuit 246 correspond to the edges of the bar. This output would be all that would be necessary from the mark detector circuitry if additional circuitry were not to be added to aid in detecting the leading edge of the first bar. The center photosensitive section U is connected to the terminals 210' leading to a slope detecting sircuit 254 of similar construction to that of slope detecting circuit 244. In the same manner the output of the slope detecting circuit 254 is applied to another latching bilateral reciproconductive circuit 256. Corresponding outputs through reciproconductive circuits 246 and 256 are applied to an AND gating circuit 258 having output terminals 260. Complementary output of first reciproconductive circuit 246 is applied at output terminals 261. The output terminals 260 and 261 are applied to the set and reset terminals of another bilateral reciproconductive circuit 264 having output terminals 266 and 268. The latter terminals are applied to a mark processing circuit 308 of conventional nature. With this arrangement the size of the video signal envelope must be increasing and the center photosensitive section output must be increasing in order to indicate that the transition of a bar is being encountered. The transition of the output of the final reciproconductive circuit 264 now corresponds to the transitions from light to dark and dark to light as the bars are passed over. Timing information of accurate nature is readily extractable from the signals at terminals 266 and 268.

Figure 20:
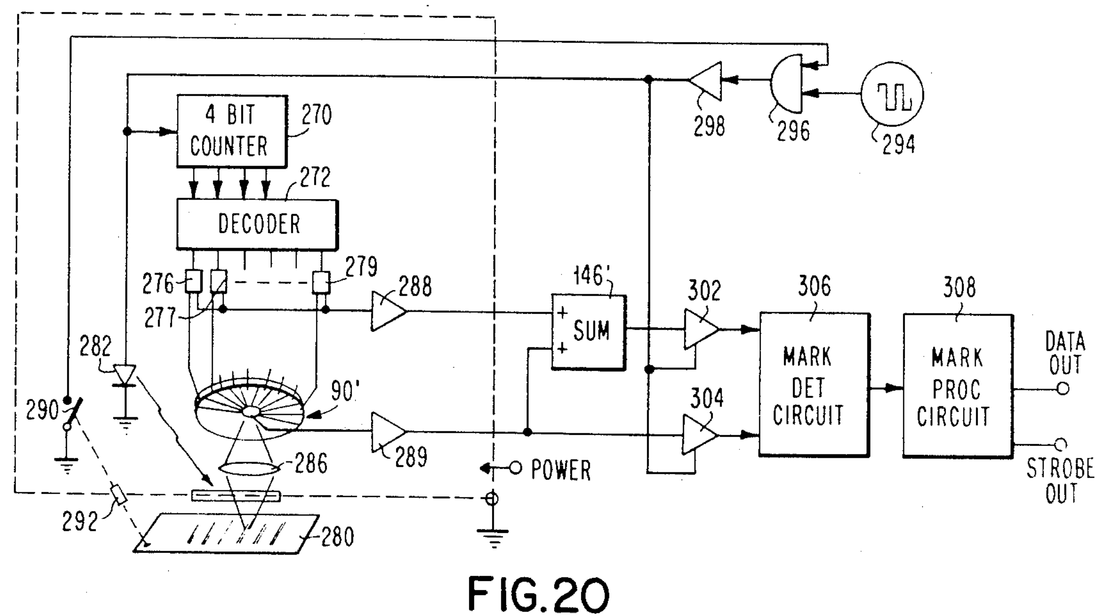
FIG. 20 is a functional diagram of a multiplexing circuitry according to the invention.

FIG. 20 shows a multiplexing arrangement suitable for use with a hand held scanning device. Within the hand held probe portion, indicated by the dashed lines, there are a binary counter 270, a multiplexor comprising a decoder 272, a multiple of switches 276–279, a light emitting diode (LED) 282 and a sectored photosensitive device 90' packaged together in a tubular package, with a window 284 in one end. A lens 286 and preamplifying circuits 288, 289 are preferably included. The electronic components are integrated on a single wafer, or packaged in a hybrid configuration using separate interconnected wafers.

In a typical hand scanner a "pen-down" or probe actuate switch 290 is operable when the probe is pressed against a document 280 to be scanned. Such a switch is conventionally arranged within the probe barrel and mechanically actuated by a pin 292 or the like schematically indicated as passing through the probe wall for contacting the document. Such arrangements are entirely conventional. The switch 290 is used to turn on a clock pulse generating circuit 294 preferably operating at a frequency of the order of 1 megaHertz, by means of an AND gating circuit 296 and a driving circuit 298 for pulsing the light emitting diode 282. Light emitting diodes (LED) furnish higher light output in such a pulse mode than in a direct potential mode. The 1 mergaHertz wave for operating the Led also operates the multiplexing circuitry and preferably a pair of automatic gain controlled (AGC) amplifiers 302, 304 are keyed to the same clocking signal in this multiplex signal arrangement. From the AGC amplifiers, video signals are detected and the output is applied to subsequent data processing circuitry. The multiplexing is achieved by the counter 270 and a one-out-of-sixteen decoder 272. The output of the binary counter 270 provides an address for each of the multiplex switches 276 . . . 279, which may be similar to the Fairchild No. 3705, a MOS monolithic multiplex switch. This switching arrangement serially connects the 32 sector-couples to the summing circuit 146 to "rotate" the array 90'. With a 1 mHz clock, each sector pair will be examined once every 16 usec. The outputs of the two amplifiers 302 and 304 are applied to a mark detecting circuit 306, and the output of the latter is processed in a conventional mark processing circuit 308.

In the overall operation of circuitry according to the invention, there is a requirement for circuitry for determining which photosensitive sector-couple is most closely aligned with the marks and circuitry to extract the timing information from the current waveform that sector-couple.

The mark detecting circuit 306 is responsive to a voltage waveform proportional to the current of the selected sector-couple, and for producing a digital output which rises and falls with the edges of the bars (marks and spaces) being scanned.

As a bar is scanned the current of the oriented sector-couple will change from some value representing the white or background level to some lower level representing the mark level. The edge of the mark can be located by observing when the current of the sector-couple is half way between the white level a and the dark level (assuming a linear photocell structure). This represents the point where one-half of the sector-couple is responding to the dark bar, and th other half is responding to the preceding space. Thus, the photocell is centered at the edge of the bar.

Figure 21:
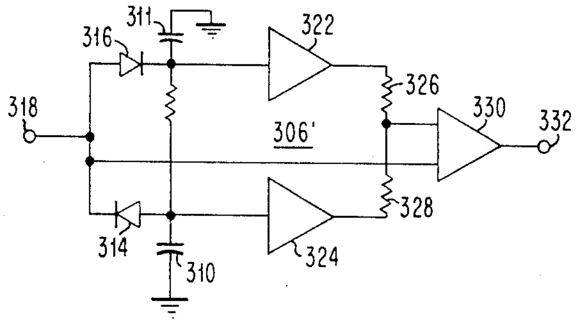
FIG. 21 is a schematic diagram of a mark detecting circuit according to the invention.
Figure 22:
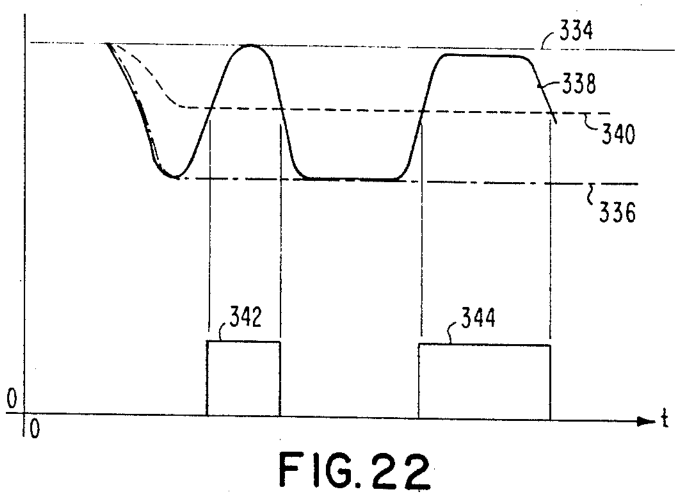
FIG. 22 is a graphical representation of waveforms obtained with the mark detecting circuit of FIG. 21.

FIG. 21 is a schematic diagram of one embodiment of mark detecting circuit 306', and FIG. 22 is a graphical representation of some associated waveforms. Positive and negative peak storage is involved. Assume that initially a pair of negative and positive peak storage capacitors 310 and 311 are discharged to such a value that neither of the charge coupling diodes 314, 316 is conducting. If the analog input voltage at the input terminals 318 decreases, the diode 314 will conduct and lower the voltage on the capacitor 310. Hence the voltage, on the capacitor 310 will assume a value almost equal to the lowest value appearing at the cathode of the diode 314. Similarly the voltage across the capacitor 311 will be the most positive voltage at the input terminals. A resistor 320 is included to slowly discharge the positive storage capacitor 311 and charge the capacitor 310 so that the positive store and negative store can follow slow variations in the peak values at the inut terminals 318.

A pair of buffer amplifying circuits 322, 324 prevent the capacitors 310, 311 from discharging significantly. A voltage divider comprising series connected resistors 326 and 328 are proportioned to establish the mark threshold. If the resistors 326, 328 are of equal value, this threshold will be half way between the positive store and negative store voltages. Resistors of differing values are, for example, chosen for compensating a nonlinear photocell. Comparing the input analog to the mark threshold in a differential amplifying circuit 330, for example, gives the desired output. The output from this circuit 306' at terminals 332 contains mark edge position information necessary for decoding transition significant bar coding.

Such a decoder could be based on that described in the above-mentioned U.S. Pat. application, Ser. No. 31,959 of Ernie George Nassimbene.

FIG. 22 represents waveforms as obtained with the mark detection circuit 306'. The upper limit of light level as reflected form the light background of a document is represented by the curve 334, while the deepest black level is represented by the curve 336; the latter is developed along the device output curve 338 as the photoresponsive curve 338 device traverses the first bar. The chosen threshold value is represented by the curve 340, which also depends from the light level at the beginning of the scan. The intersections of the threshold and scanning curves 340 and 338 are interpreted as mark-space transitions. Thus the idealized pulses 342 and 344 represent spaces or marks. The use of marks simplifies the subsequent logic circuit design, but it should be understood that the more conventional approach can be used as well by those skilled in the art.

Figure 23:
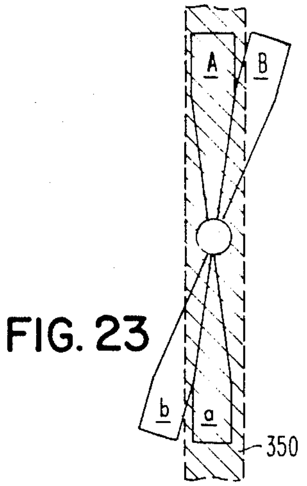
FIG. 23 is a graphical representation of the alignment of a photosensitive device according to the invention and optical bars or marks.

Fundamentally, according to the invention, one sector-couple out of the entire array is selected for the scanning operation. That sector-couple is the one most closely aligned, if not prefectly so, with the bars. One method of determining which photosensitive sector-couple is most closely aligned with the bars (marks) is to see which sector-couple is darkest when centered over a bar. The "level of darkness" from the selected sector-couple is stored in a peak value storing circuit. Thereafter this stored peak value is compared with the output of each of the other sector-couples in turn. If another sector-couple is found to have a darker level, the circuitry of the invention is arranged to switch to that sector-couple. Conventional address register, comparator and switching circuitry are available for the purpose. FIG. 23 represents vertically oriented bar 350 and two of the 16 sector-couples. Here the sector-couple Aa is aligned and the sector-couple B*b* is not. Thus the latter sector-couple B*b* will respond to some of the white background space on either side of the bar 350 and the output current of a photosensitive sector-couple and/or that of an amplifier coupled thereto (in the direction of mark) will be reduced compared to the output of the sector-couple Aa which will have the largest peak-to-peak swing of all sector-couples. This, then, is used as a criterion for determining which sector-couple is in best alignment. Thus after scanning one bar the best aligned sector-couple is switched into the circuit.

This method is dependent on the width of the bars. If the bars were as wide as the overall array, all sector-couples would respond at total dark level. If the bar 350 were twice the width shown in FIG. 23, then both sector-couples A*a* and B*b* would be equally excited. Therefore this scheme fails for bar coding where single width and double width bars are used. However, it is satisfactory for single width bar coding and, if a single width "alignment" bar is placed in front of single and double width bars, it can be used to provide initial photoarray alignment.

Figure 24:
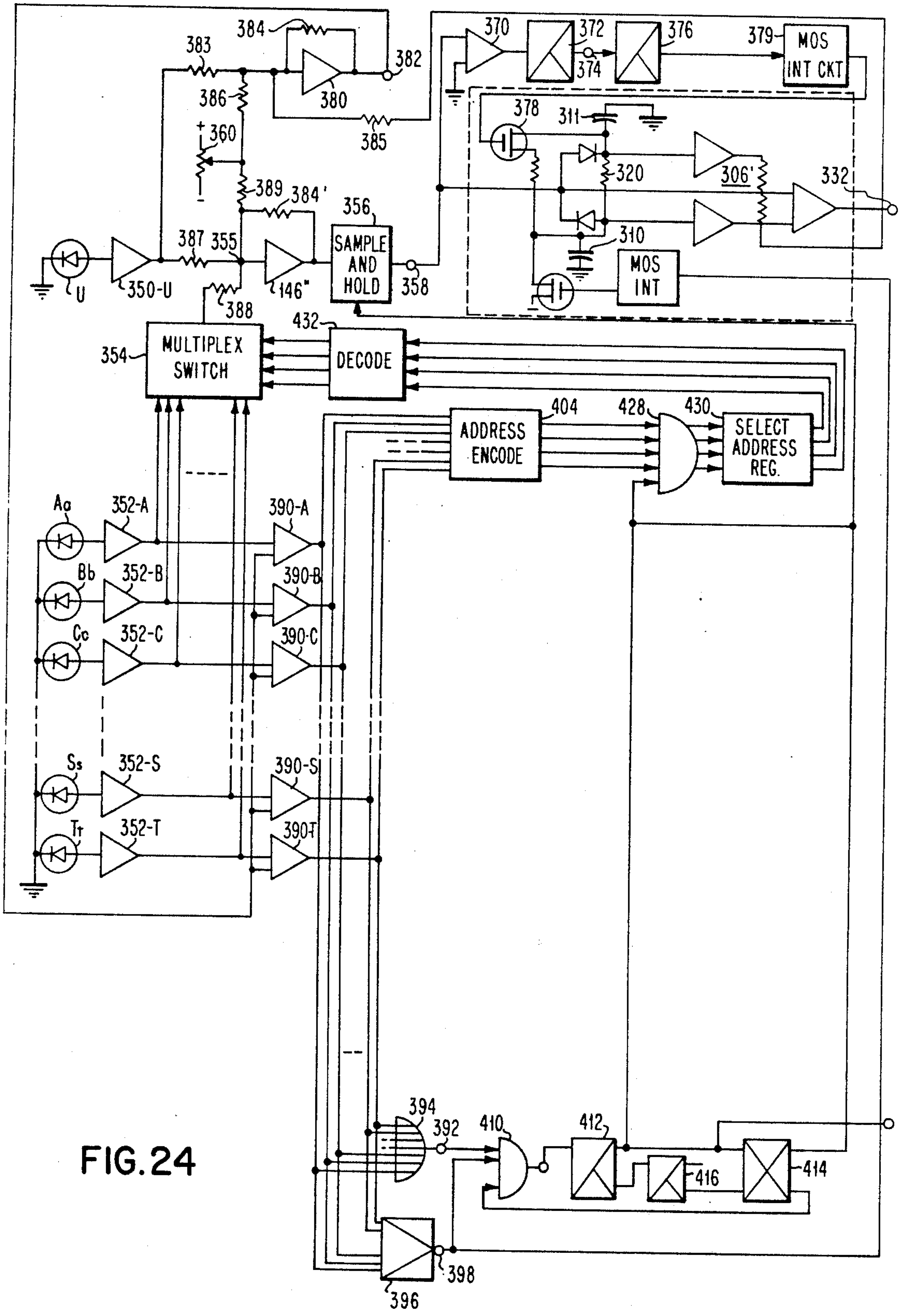
FIG. 24 is a functional diagram of a circuitry for use with the photosensitive scanning array according to the invention.

FIG. 24 is a schematic diagram of circuitry for implementing this technique. The 16 photosensitive sector-couples A*a*, B*b*. . . T*t* and the photosensitive section U are followed by amplifying circuits 350–U, 3502–A, 352–B . . . 352–S and 352–T which develop voltages at the output terminals proportional to the input current from the respective photosensitive devices. These amplifier circuits may be conventional operational amplifiers of the type having a resistor connected from output terminals back to the inverting input terminals to establish the constant of proportionality. The output terminals of one of these amplifying circuits is selected by a 16 position electronic switch 354. The output of the selected amplifying circuit is summed in a summing circuit 146'' with the voltage from the center section amplifier 350–U, to produce an inverted selected waveform at the input terminals of a sample-and-hold circuit 356 having output terminals 358. The sample-and-hold circuit 356 is used to briefly disconnect the summing amplifier 146'' from the succeeding circuitry as each different photoresponsive sector-couple is selected to prevent switching transients from appearing in the resultant analog waveform.

Figure 25:
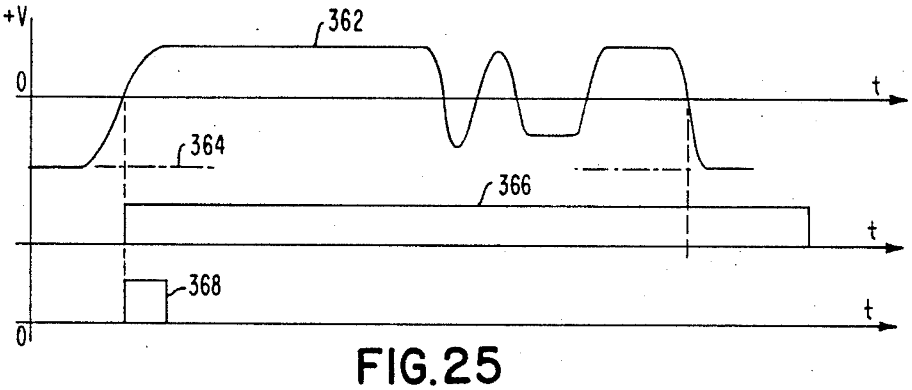
FIG. 25 is a graphical representation of waveforms obtained with the circuitry of FIG. 24.

A supply voltage tapping potentiometer 360 at the input terminals of the summing amplifier 146'' is adjusted, as shown in FIG. 25, so that the voltage at the terminals 358 represented by the curve 362 is above ground when the photosensitive array is responding to light reflected from a white paper background and at a level represented by line 364 when the array is sufficiently away from the paper so that no light is reflected onto the array. Curves 366 and 368 represent timing waves from a probe actuate switching circuit and a reset pulse circuit to be described.

When the input to a comparator 370 (FIG. 24) goes positive, a holding monostable reciproconductive circuit 372 having a 100 ms period is triggered. The unstable period of 100 ms was chosen because it is longer than it will take an operator to scan a bar or mark at the slowest speed. Thus the indication that the probe has been actuated will not disappear during scanning, but only after the probe has been lifted for 100 ms.

A monostable reciproconductive circuit 376 is triggered from the leading edge of the wave 366 and the resulting pulse 368 is applied to a switching transistor 378 for bringing the capacitors 311 and 310 of the positive and negative peak storing circuits in the mark detecting circuit 306' to the level of the analog input at the terminals 358. In practice, field effect transistors are desired for such circuitry and MOS interfacing circuits 379 may be necessary for matching impedances. Those skilled in the art will readily understand.

After the first mark is scanned, the most negative level (Mark Level) reached at the terminals 358 is stored in the negative store circuit capacitor 310. When this is properly summed in another summing circuit 380 with the output of the center photosensitive section U and the bias obtained by adjusting the potentiometer 360, the resultant voltage at the output terminals 382 is equal to the voltage reached by the selected amplifier as a bar or a mark was read. In the design of the circuitry for this purpose the constants required are obtained by proper choice of the values of the resistors 383 . . . 389. The bias and center section U voltages that were summed by the summing circuit 146 are subtracted by the summing circuit 380 in producing the resultant comparing voltage. The voltage at the terminals 382 is compared against the voltage outputs of all the amplifiers 352–A . . . 352–T in the comparing circuits. These comparing circuits are arranged to produce O or ground level output or a positive output level (at about 8 volts). If any other sector-couple is better aligned than the previously 390–A . . . 390–T selected sector-couple, the associated comparator output will rise to a positive level (or "up" state). The fact that any comparator is at the positive level or "up" is indicated by an "ANY" output line 392 of a multiple OR gating circuit 394 connected to all comparators 390–A . . . 390–T.

A detector 396 also connected to these comparators has an "LT2 line" 398 for determining if there is a sole comparator (less than two) whose associated sector-couple is responding to a darker level than is stored in the negative peak storing capacitor 310. It is desirable to have no more than one comparator at the positive level or "up" state; then it is known that only one photosensitive sector couple is darker (and therefore in better alignment) than the selected one, and the darker one than can be switched to the summing circuit 146''. If two or more sector-couples are darker, the darker (or darkest) of them is selected first. This circuitry is arranged for operation of the detector 396 sensing that two or more are darker, and releveling the overall circuitry until but one other sector-couple is responding to a bar darker than the selected one. The voltage at the terminals 398 is applied to a negative storing circuit in the form of a transistor 400. (Where the latter is an FET an MOS interface Circuit 402 is preferably interposed as discussed above). This lowers the voltage on the capacitor 310 at a predetermined rate. When the circuit adjusts to the level at which the detector 396 detects that less than two comparators are up or at the positive level, the capacitor discharging switch 400 is opened, and the overall circuit holds steady. When this occurs, the 4-bit address of that one "up" comparator appears at the output of an address encoder 404.

Figure 26:
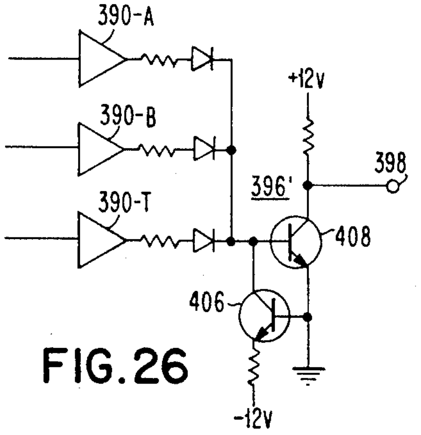
FIG. 26 is a schematic diagram of a detecting circuit according to the invention.

FIG. 26 is a diagram of one embodiment of the detector 396. The comparator outputs assume either of two states "up" and "down" as previously related. The "down" state output voltage is at ground or negative potential, and the "up" state output voltage is at a positive potential (8 volts, for example). A current source transistor 406 is connected to sink 200 ua at its collector electrode. With no comparators up, this will keep another transistor 408 biased off. If one of the comparators now goes to the "up" state, it will supply 140 ua to the current summing junction from its 8 volt level. However, since the sink transistor 406 is trying to sink 200 ua, it can be seen that a single comparator cannot supply enough current to turn on the second transistor 408. When two comparators are on, however, 280 ua will be supplied, and a net current of 80 ua is available to turn on the second transistor 408. This current will saturate the latter transistor 408, and the output of the detector 396' at the terminals 398 will drop ("down"), indicating the two or more comparators are on.

When exactly one comparator is up, the "ANY" line terminal 392 is "up" and the detector 396 is "up." The terminals 392 and 398 are connected to an AND gating circuit 410. The output line of the latter is connected to an address-loading monostable reciproconductive circuit 412. The set terminal of a holding bilateral reciproconductive circuit 414 is connected to the unstable output terminal of the monostable circuit 412. Another monostable reciproconductive circuit 416 connected between the other stable output terminal of the circuit 412 and the reset terminal of the hold circuit 414 for resetting the latter. The hold terminal of the hold circuit 414 is brought to the AND gating circuit 410 normally enabling the latter.

Figure 27:
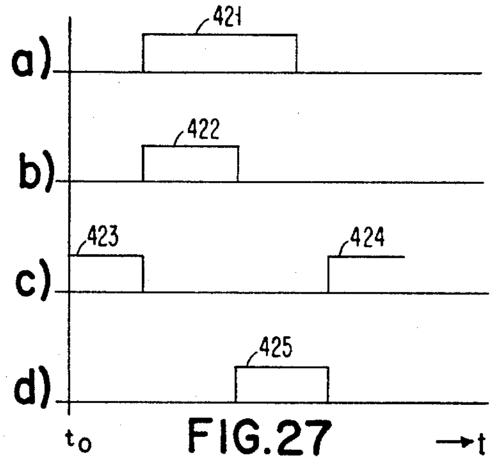
FIG. 27 is a graphical representation of the operation of a portion of the circuitry of FIG. 26.

FIG. 27 is a graphical representation of waveforms of these components. The uppermost curve 421 represents the output of the AND gating circuit 410; the unstable state of the address loading circuit 412 is represented by the next curve 422; the curves 423 and 424 represent the hold state of the hold circuit 414; while the unstable working state of the resetting circuit 416 is represented by the curve 425. When the AND gating circuit output comes up the address loading circuit 412 is triggered to the unstable state and a multiple circuit gate 428 will transfer the address of the "up" comparator in the encoder 404 into a select address register 430. This register holds the address of the sector-couple that is selected and connected to the summing circuit 146''. When a new address is selected, a one-out-of-sixteen decoding circuit 432 which follows the register 430 energizes one of 16 output lines, turning on the corresponding tap of the 16 channel switch 354.

As new (and darker) sector-couples are detected and selected, the capacitor 310 in the detecting circuit 306' is discharged to the lower level of the new sector-couple. During the scan of a long code field, the array may be inadvertently rotated so that the aligned sector-couple loses alignment. When this happens, the capacitor 310 will follow the mark amplitude change through operation of the resistor 320, and the corresponding change in comparing voltage at terminals 382 will allow selection of the next sector-couple to show alignment.

In the preceding embodiment , the circuitry was arranged for storing a measure of darkening to which the selected sector-couple had gone as it scanned bars (marks), and for comparing this level of darkness to the levels of all other sector-couples. If another sector-couple level indicated a level darker than this stored level, the darker sector-couple was selected, and all sector-couples were subsequently compared to it.

Figure 28:
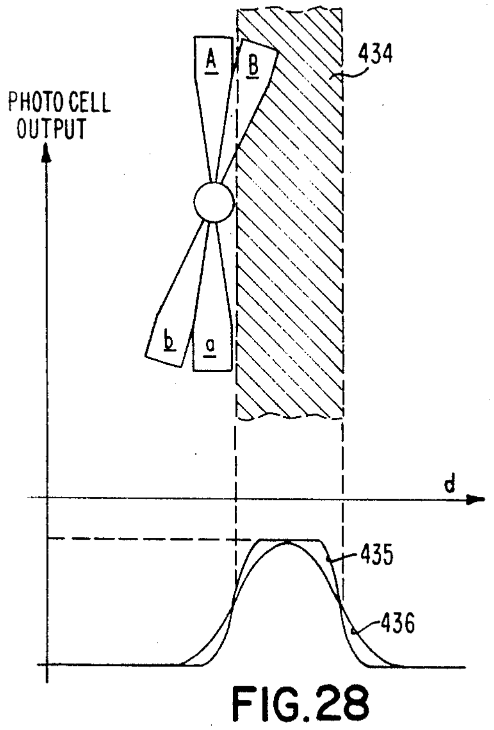
FIG. 28 is a graphical representation of a photosensitive device according to the invention and optical marks, and waveforms resulting from the scanning of that mark by that device.

It was mentioned the above-described arrangement requires additional circuitry for resolving bars of more than one width. This is illustrated in FIG. 28 which represents an aligned and a non-aligned sector-couple beginning the scan over bar and the resultant voltage outputs of the sector-couple amplifiers. The bar shown is wide enough so that both sector-couples A*a* and B*b* will see nothing but the bar 434 at one position. The curves 435 and 436 represent the outputs of the sector-couples A*a* and B*b* respectively. Further, according to the invention, circuitry is provided for distinguishing an aligned sector-couple from a non-aligned sector-couple by the rate of rise of the two waveforms resulting; the output of the aligned sector-couple rises and falls at a significantly higher rate than that of the non-aligned sector-couple.

Instantaneous differentiaton is one basic way of measuring the rate of change of the two signals but because differentiation is a noise generating process, other arrangements have been developed.

Figure 29:
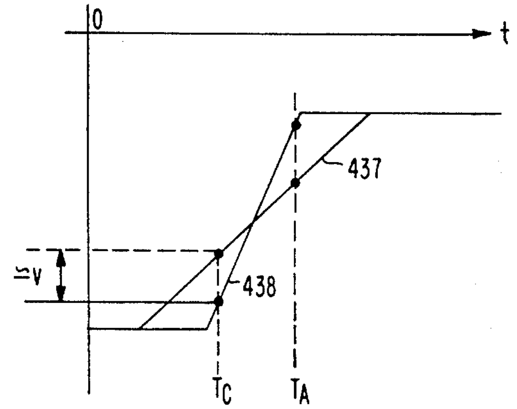
FIG. 29 is a graphical representation of a basic detection scheme according to the invention.

A better way of comparing the rates of rise of two waves 437 and 438 is illustrated by FIG. 29. In the figure two sample times are defined. The time $T_C$ occurs on the lower part of the waveform, and the time $T_A$ near the top. If the waveform of the selected sector-couple is represented by the curve 437 of shallow slope, it can be seen that if any sector-couple is in better alignment, and consequently has a wave represented by the curve 438 of steeper slope, then at $T_C$ time the better aligned sector couple has a lower output than the selected one, and at $T_A$ time it has a higher output. This, then, is used as the selection criterion in the circuitry to be described below.

Note that the circuitry measures not only a higher (average) rate of rise between the two points, but also measures the magnitude of swing of the candidate for selection as compared against the selected sector-couple.

Figure 30:
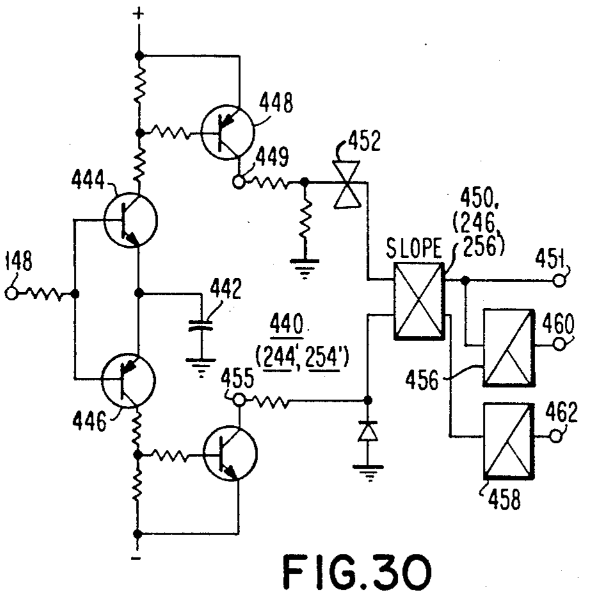
FIG. 30 is a schematic diagram of a slope detecting circuit according to the invention.

A schematic diagram of one embodiment of a slope detecting circuit 440 is shown in FIG. 30. A capacitor 442 is charged positively or negatively through transistors 444 and 446, respectively. When the analog input waveform at the terminal 148 is going negative the latter transistor 446 is conducting. When the input reaches the most negative level, the transistor 446 stops conducting, leaving the capacitor 442 about 0.5 volt above the input voltage level. When the input goes in position direction, the forward bias across the emitter-base junction of the transistor 446 decreases, and becomes reversed biased. When the input gets about 0.5 volts positive with respect to that on the capacitor 442, the other transistor 444 starts to conduct. This turns on another transistor 448 which raises the terminal 449 at the collector electrode to a value sufficient to set a slope bilateral reciproconductive circuit 450. An inverting circuit 452 is shown inasmuch as the bilateral reciproconductive circuits in the drawing are generalized for set and reset on the same pulse polarity. In this case inversion is necessary to reconcile polarity. Obviously other circuitry will be suggested to the artisan.

When the input wave reaches the most positive level, the transistor 444 stops conducting. Any noise present will cause it to go momentarily into conduction, but this does not affect the slope latching circuit 450 because it is already set. When the input wave drops by about 1 v from the peak value, the transistor 446 again conducts, causing another transistor 454 to conduct which resets the slope latching circuit 450. This slope detecting circuit 440 is one such circuit for application in the circuit of FIG. 15 for detecting circuits 244 and 254.

Figure 31:
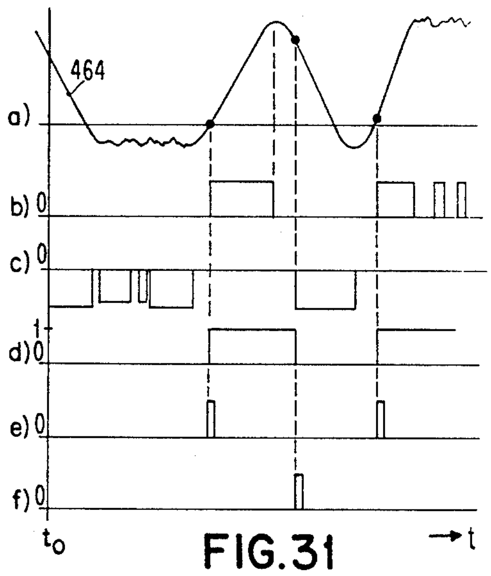
FIG. 31 is a graphical representation of waveforms obtained in the operation of the slope detecting circuitry of FIG. 30.

The slope latching circuit 450 is coupled to a pair of monostable reciproconductive circuits 456 and 458 for generating timing pulses as shown in FIG. 31. The curve 464 is a graphical representation of an analog wave from an amplifier following a sector-couple as applied at input terminals 148. The waveforms at FIG. 31(b) and (c) are those obtained at terminals 449 and 455 respectively. These waves set and reset the slope latching circuit 450 at the positive (actuated) terminals of which the square waveform at FIG. 31(d).

The monostable reciproconductive circuit 456 is triggered from the leading edge of the slope circuit 450 waveform resulting in the pulses at FIG. 31(e). The pulse of FIG. 31(f) results form the trailing edge of the waveform of FIG. 31(d) or the leading edge of the complementary wave. The peak-to-peak swing of the input is arranged for approximately 5 or 6 volts so that the times $T_C$ and $T_B$ occur near the negative and positive peaks of the input waveform, yet the 1 volt "dead zone" at the input renders the circuit insensitive to noise at the input terminals. Such noise might be generated in sensing the individual fibers in the paper by high resolution optical systems.

Figure 32:
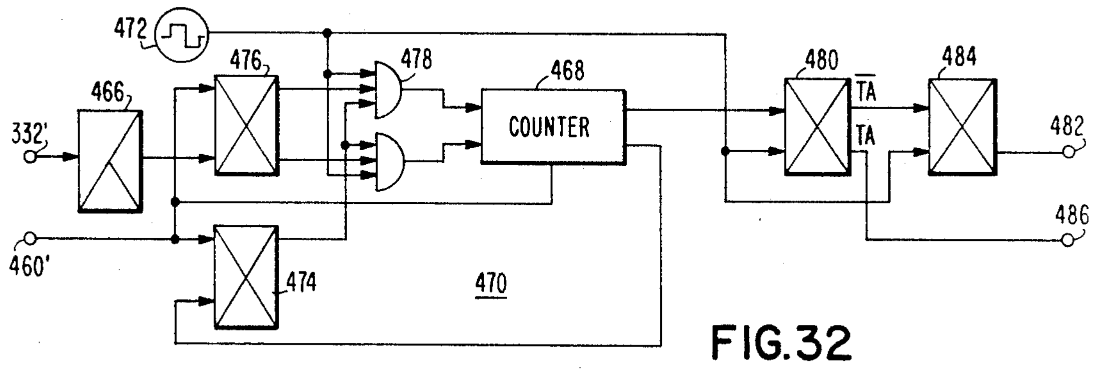
FIG. 32 is a functional diagram of peak predicting circuitry according to the invention.

The second point on the slope (FIG. 29) is more difficult to analyze. This point occurs slightly before the waveform reaches the peak, and must therefore be predicted. Circuitry for predicting the time $T_A$ is shown in FIG. 32.

The signal mark goes from a "0" to a "1" when the analog signal from the selected sector-couple is halfway to the top of the expected excursion. At time $T_C$ a pulse is applied to terminals 460′ (from circuit 456) and a binary counter 468 in the predicting circuit 470 starts counting high speed clock pulses as from a generator 472. When mark goes positive, indicating the analog waveform is halfway up, the counter is reversed and starts counting down. When the counter 468 returns to zero, the signal from the selected sector-couple should be near the top of the expected excursion.

More particularly the pulse at time $T_C$ resets the counter 468 to zero, sets a "count enable" latching reciproconductive circuit 474 and sets a "count direction" latching reciproconductive circuit 476 to the "up" state. When mark goes to "1," monostable reciproconductive circuit 466 is triggered for deriving an actuating pulse. This pulse is applied to reset the "count enable" circuit 746 and the direction of the count is reversed. The counter 468 as shown is composed of cascaded component counters (such as Texas Instruments type SN74193), and has an output line termed "borrow." When the counter is counting down and reaches zero count the "borrow" output drops, indicating this fact. The counter 468 is flipped to all "1'S" on the next clock pulse. If the counter is large enough so that the high order bit (HOB) is never set during the longest count up expected, then sensing when the high-order-bit goes to a 1 gives indication that the counter 468 has underflowed. This is used to stop the counter by resetting the count enable circuit 474. A pair of bilateral reciproconductive circuits 480, 484 delay the pulse at time $T_A$ by one clock pulse, and also generate a pulse at time $T_{AD}$ which is a delayed time $T_A$ pulse.

Figure 33:
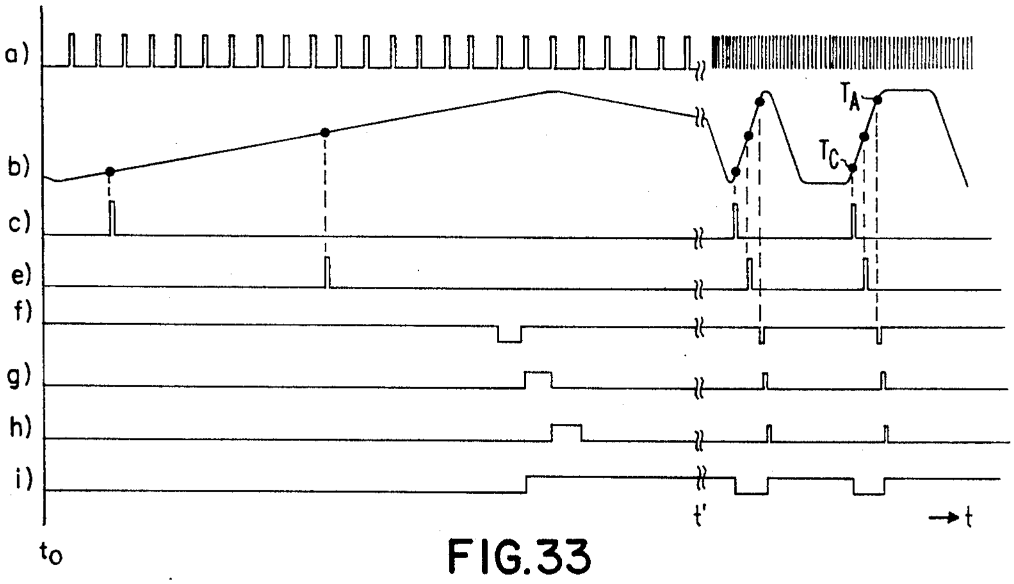
FIG. 33 is a graphical representation of waveforms obtained in the operation of the peak-predicting circuitry of FIG. 32.

FIG. 33 is a graphical representation of waveforms obtained with the predicting circuitry. A train of typical clock pulses from the generator 472 is shown in FIG. 33(a). The analog mark signal at the terminals 332′ is represented at FIG. 33(b). Note that as shown the time scale changes at the time $t'$; the early scale is greatly expanded to show the 1 mHz clock pulses with respect to one cycle of the input wave. The pulse ($Tc$) input at the terminals 460′ is shown in FIG. 33(c). FIGS. 33(d), (e), (f) and (g) respectively illustrate the timing of pulses at the output of the reversing monostable reciproconductive circuit 466, on the borrow line from the counter 468, at the terminals 486 and at the terminals 482. The high order bit line from the counter 468 to the enable circuit 474 carries the wave shown in FIG. 33(h).

FIG. 34 illustrates circuitry for implementing the rate-of-rise technique by comparing the sector-couple of the selected waveform against that of all of the others at the two times $T_A$ and $T_C$. Any sector-couple that is darker than the selected one at time $T_C$, and lighter than at time $T_A$ is in better alignment. A simplification in circuitry will result from limiting the examination to the sector-couples on either side of the selected sector-couple. This is feasible because a sector-couple which was once aligned is misaligned on any rotation of the array in the course of the scan of a long data field. On such rotation of the array, it will always be an adjacent sector-couple which first is better aligned. Hence by limiting the switching to adjacent sector-couples on the basis of information gathered at times $T_C$ and $T_A$ (which identify points on the waveform), a new sector-couple can be selected on the measurement of the rate-of-rise.

Initially, a different scheme is used to select the proper sector-couple. When power is applied, some random sector-couple is selected and circuitry for switching only to an adjacent sector-couple may not otherwise find the optimum sector-couple before scanning is over.

As mentioned earlier, selection of the darkest sector-couple, based on a single width alignment mark, is used to select the proper sector-couple initially. Then after this mark has passed, the circuitry is switched to the rate-of-rise (ROR) method. A start-up circuit 490 is used to switch between the darkest-cell mode and the ROR mode. A bilateral reciproconductive circuit 492 is set for the darkest cell mode and the ROR mode is used when the circuit is reset.

With the exception of the start-up circuit 490 and the ROR circuitry, the circuitry is much like that of FIG. 24. The first difference is that the circuitry for addressing the optimum sector-couple and gating that address to the select address register 430 is simplified at a negligible reduction in switching rate by a minor change in components. The address encoding circuit 404, the OR gating circuit 394 and the sole comparator detector 396 are replaced by a single monolithic or integrated circuit 426 commercially available "priority encoder" circuit, Fairchild type 9318. The encoder circuit 426 is connected to the output terminals of the comparator circuits 390–A . . . 390–T and is arranged to encode the highest address (or the lowest) on the same four output lines as for the address encoding circuit 404 and the circuit has an "any select" terminal 427 which comes up when any comparator circuit is up as did the OR gating circuit 394. Since a valid address is present at the output of the address encoding circuit 426 when multiple inputs are activated, the LT2 circuit is no longer necessary. The AND gating circuit 410' has one less input line, of course. With this modification the overall circuit arrangements of FIGS. 24 and 34 both operate in a recycling manner until the optimum sector-couple is selected unless the better aligned sector-couple happens to be the one having the highest address initially. Another difference is that the comparing voltage generator 380' has two sources of reference voltage. When the circuit 492 is set, the source is the negative storage capacitor in the mark detector circuit 306' and when the circuit 492 is reset the selected sector-couple is the source. A third difference is that the address register 430 is a static register, while the register 430' is arranged to be loaded in parallel like a static register and also to function as a binary up/down counter.

The address of the selected sector-couple (SA) is routed to two data selectors 494, 496 (such as TI type SN54150). These selectors select one out of 16 input lines and connects that line to the output terminals. The four bit address determines which input line is to be used. The data selector ($n$+1) 494 is connected to comparator 390–($n$ 1) and the data selector ($n$−1) 496 is connected to the comparator 390-($n$−1), where n is the comparator of the selected sector-couple. For example, where $n$ is 5 in binary addressing (corresponding to comparator 390–E) the first selector is connected to comparator 390–F and the other to comparator 390–D. By strobing these outputs of these comparators into bilateral reciproconductive circuits 502 and 504 at time $T_C$ and into bilateral circuits 506 and 508 at time $T_A$, the likely candidate for best alignment is identified. The bilateral circuits 502, 504, 506 and 508 are normally in the reset condition. If on comparison at $T_C$ time an adjacent sector-couple is in better alignment one of the $T_C$ point circuits 502 or 504 is set for storing that indication in response to the corresponding comparator 390–X having a greater output corresponding to lower or darker sector-couple output. At $T_A$ time the reverse ratio is indicative of the better quality and inverting circuits 510 and 512 are interposed in the gating circuitry to the bilateral circuits 506 and 508. One of the latter is therefore set only if a better alignment is determined at both points on the wave. Positive control of any incrementing is insured by cross-coupling the output terminals of the bilateral circuits 506 and 508 to count incrementing and decrementing AND gating circuits 514 and 516 respectively. At time $T_{AD}$ (shortly after time $T_A$) if the next ($n$+1) sector-couple is a candidate and the last ($n$−1) sector couple is not, the address register 430' is instructed to count up by 1 to the address corresponding to the ($n$+1) sector-couple.

The timing chart for the start-up circuit is shown in FIG. 35. The curve 517 in FIG. 35(a) represents the analog wave from the selected sector-couple of the hand held probe as amplified. The positive peak storage variation is indicated by the curve 518, while the curve 519 represents the negative peak store level; this curve changes level as the analog wave drops in the scan but approaches a constant level $V_A$ for a given document. A threshold level (to be described further below) is indicated by the curve 520. It is essentially the sum of the instantaneous voltage of the wave 519 and the constant value $V_A$. When the probe is put down onto the paper, a probe actuate circuit sets a reset bilateral reciproconductive circuit 376'. The probe actuate timing is indicated in FIG. 35(b). The action of the reset circuit 376' through an interface circuit 379' brings both the positive and negative storage capacitors in the mark detecting circuit 306' to the level of the selected sector-couple and also sets the starting bilateral reciproconductive circuit 492'. A current source 522 and a resistor 524 provide an initial "threshold" voltage $V_A$. Since the resistor 519 is connected to the negative store circuit, the voltage dropped across the resistor 519 is added to the voltage ($V_{NS}$) appearing at the output of the negative storage circuit to give a voltage $V_{NS} + V_A$. When the voltage on the line at the terminal 358 rises above the voltage (NS + $V_A$), the first space is being approached. A comparator 5226 is arranged to sense this fact and reset the starting circuit 492'; thus the ROR mode is established.

The ROR circuitry just described used two measurement points, at times $T_C$ and $T_A$, on the space-mark transition to detect sector-couples with a higher rate of rise. One measurement point is sufficient in some instances. Support, for example, that if a photocell adjacent to the selected cell were to pass the candidacy test at $T_C$, and thereafter was always observed to pass the test at $T_A$. Selection circuitry operating on a single measurement at time $T_C$ is performing well. Where one measurement point is insufficient, it has been found that using the pulse outputs from circuits 456 and 458 at times $T_C$ and $T_B$ instead of pulses at times $T_C$ and $T_A$ will give acceptable results, even though this is then not strictly a slope measurement technique. Such discoveries lead to simplified circuitry. FIGS. 35 (c), (d), (e) and (f) show the output waves at the terminals 451' of the positive slope detecting circuit 440', the reset circuit 376', the output of the first space comparator 522 and the start circuit 492'.

The circuitry which is arranged for connecting the selected sector-couple by referring to adjacent ones is used in some applications for obtaining better resolution of narrow spaces where the document tranmits light horizontally through he fibers of the document itself. Another summing circuit is arranged for summing the offset voltage, the center section voltage—if one is used—and the outputs of the ($n$−1) and the ($n$+1) sector-couples. The sum is inverted, preferably in another operational amplifier and a percentage is mixed with the output of the sample-and-hold circuit. Due to the inversion, the output of the selected sector-couple obtained from sensing a narrow space between marks is enhanced by the outputs of the adjacent sector-couples sensing all or parts of adjacent marks. Mixing potentiometers are interposed for adjusting the proportion of enhancing voltage for a given document or type of document.

The circuitry described thus far operates on the sector-couples in parallel fashion (rather than sequentially), and as a consequence needs a large number of amplifiers followed by the same number of comparators. The arrangement is advantageous for partial arrays—for example three or four sector-couples A*a* . . . C*c* (or D*d*) arrange in a probe of the type disclosed in the copending U.S. Patent application, Ser. No. 223,555 above mentioned. A less expensive approach for a full array is to serially sample the large number of sector-couples at a high rate (compared to hand scanning speeds) and compare the outputs against the comparing voltage one at a time.

Circuitry to implement this multiplex mode of operation is shown in FIG. 36. A 4 mHz clock generator 472' connected to increment a 6 bit binary up-counter 530, 4 bits of which are used as a Multiplex Address Register (MAR) 530. the 4mHz clock is divided by 4 in the MAR 530 as will appear in the following description.

Every address time slot of the MAR 530 is subdivided into four time intervals $p_1$, $p_2$, $p_3$, $p_4$. In the implementation shown these four time intervals are of equal duration, but it is not at all necessary In general a new address appears in the MAR 530 at the start of the first time interval $p_1$, and this causes the sixteen channel multiplex switch 354' to switch to the next sector-couple. The remainder of the interval $p_1$ is used to let the switching transients die out. At $p_2$ time the output of a multiplex amplifier 534 is compared against either the voltage in the negative store circuit or the selected sector-couple and the results stored. The following time intervals $p_3$ and $p_4$ are used for sequential logical operations.

The sample and hold circuit 356 is used to reconstruct the signal from the selected sector-couple. However, the address in the Select Address Register (SAR) 430'' is not the address of this sector-couple, but the address one less than that of the selected sector-couple. For example, if the waveform of the sector-couple D*d* is being reconstructed at the terminal 358, the SAR address will be that of C*c*. The reason for this is so that sector-couples C*c* and E*c* can be easily examined after the start-up period.

During start-up a new sector-couple is selected by comparing the output the new sector-couple appearing at the output of the amplifier 534 in a comparing circuit 536 against the voltage in the negative storing capacitor of the mark detecting circuit 306'. If the former is less than the latter, this fact is stored at $p_2$ time in a transfer reciproconductive circuit 540. At $p_3$ time (immediately following the time interval $p_2$) the address of this sector-couple is gated into the SAR 430'', and at the same time the analog signal is sampled by the sample and hold circuit 356, and at $p_4$ time the 430'' SAR is commanded to count down by one address.

The circuitry is now in the ROR mode. The comparison of the selected sector-couple with the other sector-couple is made in a separate comparing circuit 544 connected to the input and the output of the sample and hold circuit 356. Simpler and less expensive circuitry is afforded by separate comparators, but those skilled in art may design a different arrangement for securing the same results.

The sample generator 498'is very similar to that shown in the parallel scheme circuitry of FIG. 34. The principal difference is that the pulses at $T_A$, $T_C$, and $T_{AD}$ times are now synchronized with the operation of the MAR 530, so that they each last for one complete scan of the photosensitive array (starting at the first address in the MAR 530 and ending at the end of the last one). This is accomplished by timing circuit shown for developing a pulse at terminals 546 at $T_C$ time, and by supplying the clock pulse for the peak predicting circuit 470' from the MAR terminal.

FIG. 37 is a timing diagram showing the selection of a new sector-couple using the ROR mode. Assume that the selected photocell is sector-couple Rr (binary number 13) and therefore the SAR address is binary number 12. Also assume that at $T_C$ time it was found that the sector-couple $P_p$ was a canidate for best-aligned sector-couple, and this fact is remembered by setting an ($n-1$) bilateral reciproconductive circuit 548 to the actuated state.

When the address in the MAR 530 is the binary number 12, the ($n-1$) address circuit 548 and at $p_2$ time a sample ($n-1$) AND gating circuit 550 respond. A pair of bilateral reciproconductive circuits 552 and 554 connected to the address compare counter 556 each delay this address compare indication by one address so that a sample (n) AND gating circuit 558 responds at $p_2$ time when the sector-couple $P_p$ (binary 13) is at the output of the amplifier 534, and a sample ($n + 1$) AND gating circuit 560 responds at $p_2$ time when the sector-couple R*r* (binary 14) is switched.

When the peak predicting circuit 470' delivers [a $T_A$ pulse at terminals 56] one complete scan of the array is started, in which scan a new sector-couple may be selected. When the sample ($n-1$) AND gating circuit 550 goes up the next time, it looks at the ROR comparator 544. Since it is down, and since the circuit 548 is up, a decrementing circuit 564 is set indicating that a new address is to be selected. When the pulse at the $T_A$ terminals 562 drops, the terminals 566 which deliver the $T_{AD}$ pulse goes up, and the following $MAR_1$ signal decrements the SAR 430'' by one address.

The pertinent waveforms obtained in the operation of the circuitry of FIG. 36 are graphically represented by the curves in FIG. 37 on a common time base. The line (a) delineates the MAR address time periods which are divided into quarters by the 4 mHz clocking pulses shown on line (b). The quarter period pulses $p_1$, $p_2$, $p_3$ and $p_4$ are shown on lines (c), (d), (e) and (f). $MAR_0$ and $MAR_1$ pulses are shown on lines (g) and (h) while $T_A$ and $T_{AD}$ pulses are given on lines (i) and (j). The address compare gate pulses are shown on line (k) and the sample gating pulses for addresses ($n-1$), $n$, and ($n+1$) are respectively placed on lines (l), (m) and (n). The operation of the ROR comparing circuit 544 is represented on the line (o) and the decrementing and count-down pulses are shown on lines (p) and (q) respectively.

While the invention has been shown and described particularly with reference to a preferred embodiment thereof, and various alternatives have been suggested, it should be understood that those skilled in the art may effect still further changes without departing from the spirit and the scope of the invention as defined hereinafter.

The invention claimed is:

1. Optical bar coding scanning apparatus for recovering information encoded in a series of elongated parallel bars laid down on a document in contrasting characteristic to that of said document, comprising a photosensitive device arranged for receiving light from said document being scanned, said photosensitive device having a configuration of a multiple of photosensitive sectors insulated from each other and having longitudinal axes of said sectors radiating outwardly from the center of said device at relatively small angles with respect to the longitudinal axes of contigous sectors, and electronic circuitry additively connecting said sectors in couples comprising diametrically colinear sectors for generating electric levels directly proportional to the light received.

2. Optical bar coding scanning apparatus as defined in claim 1 and wherein said multiple of sectors extends over a complete circle about said center, thereby obviating any necessity for orienting said device with respect to the direction of said bars.

3. Optical bar coding scanning apparatus as defined in claim 1 and incorporating a photosensitive section insulated from said sectors and interposed therebetween at said center, and connections from said section to said electronic circuitry for increasing the effective area of said couples.

4. Optical bar coding scanning apparatus as defined in claim 3 and wherein said section is circular in configuration.

5. Optical bar coding scanning apparatus as defined in claim 1 and wherein said sectors have substantially triangular configuration.

6. Optical bar coding scanning apparatus as defined in claim 5 and wherein said sectors have a substantially rectangular configuration extending outwardly from said triangular configuration.

7. Optical bar coding scanning apparatus as defined in claim 1 and incorporating an electronic summing circuit having input terminals and output terminals, a multiplex selector switching circuit having a multiple of separate circuit terminals and a common terminal connected to said input terminals of said summing circuit, and connections individual to said couples of sectors and said separate terminals of said switching circuit.

8. Optical bar coding scanning apparatus as defined in claim 7 and wherein said selector switching circuit comprises a multiple of field effect transistor devices having source and drain electrodes connected as switch terminals and gating electrodes.

9. Optical bar coding scanning apparatus as defined in claim 8 and incorporating a binary counting circuit having an input to which a cycling pulse wave is applied and a plurality of output terminals, and a one-out-of-*n* decoding circuit having input terminals individually connected to said counting circuit output terminals and having output terminals individually connected to the gating electrodes of said multiple of field effect transistors.

10. Optical bar coding scanning apparatus as defined in claim 7 and incorporating a mark detector circuit having positive and negative peak storing circuits coupled to said sector couples, and comparator circuits individually coupled to said sector couples and to one of said peak storing circuits and having output terminals at which levels are presented indicating over or under the level of said one peak storing circuit.

11. Optical bar coding scanning apparatus for recovering information encoded in a series of elongated parallel bars laid down on a document in contrasting characteristic to that of said document, comprising a photosensitive device arranged for receiving light from said document being scanned, said photosensitive device having a configuration of a multiple of photosensitive sectors insulated from each other and having longitudinal axes radiating outwardly from the center of said device at relatively small angles with respect to contiguous sectors.

an electronic summing circuit having input terminals and output terminals, a multiplex selector switching circuit having a multiple of separate circuit terminals and a common terminal connected to said input terminals of said summing circuit, and connections individual to said couples of sectors and said separate terminals of said switching circuit, a positive peak following circuit having input and output terminals, a negative peak following circuit having input and output terminals, electric connections from said common terminals of said multiplex switching circuit to said input terminals of said peak following circuits, another electronic summing circuit having input terminals individually connected to the output terminals of said peak following circuits and having output terminals, a slope detecting circuit having input terminals connected to the output terminals of said other summing circuit and having positive going and negative going output terminals, a bilateral reciproconductive circuit having set and reset terminals connected to said positive going and said negative going output terminals respectively of said slope detecting circuit and having a pair of output terminals, another slope detecting circuit having input terminals connected to said photosensitive section and having positive going and nagative going output terminals, another reciproconductive circuit having set, reset terminals connected to said positive going and said negative going output terminals respectively of said other slope detecting circuit and having a pair of output terminals, and an AND gating circuit having two input terminals connected individually to like output terminals of said reciproconductive circuits and having output terminals.

12. Optical bar coding scanning apparatus as defined in claim 11 and wherein said slope detecting circuits have a substantial hysteresis characteristic, thereby providing immunity to noise.

13. Optical bar coding scanning apparatus for recovering information encoded in a series of elongated parallel bars laid down on a document in contrasting characteristic to that of said document, comprising a photosensitive device arranged for receiving light from document being scanned, said photosensitive device having a configuration of a multiple of photosensitive sectors insulated from each other and having longitudinal axes radiating outwardly from the center of said device at relatively small angles with respect to contiguous sectors, electronic circuitry connected to said sectors in couples comprising diametrically colinear sectors for generating electric levels proportional to the light received, peak following circuitry comprising an OR gating circuit comprising another resistance element and a multiple of unilateral impedance devices having one terminal connected in common to said resistance element and the other terminals individually connected to said sector couples, another OR gating circuit comprising another resistance element and a like multiple of like unilateral impedance devices having one terminal of polarity opposite to that of the first said unilateral impedance devices connected in common to said other resistance element and the other terminals individually connected to said sector couples, a summing circuit having a plurality of input terminals individually connected to said common connections and having output terminals at which an indication of light level received by said photosensitive device is delivered.

14. Optical bar coding scanning apparatus as defined in claim 13 and incorporating a photosensitive section interposed between and insulated from said sectors, and a connection from said section to said summing circuit at another input terminal.

15. Optical bar coding scanning apparatus as defined in claim 14 and incorporating a multiple of amplifying circuits interposed individually between each sector couple and the associated unilateral impedance device.

16. Optical bar coding scanning apparatus as defined in claim 14 and incorporating another amplifying circuit between said photosensitive section and said summing circuit.

17. Optical bar coding scanning apparatus as defined in claim 1 and incorporating automatic sector couple selection circuitry comprising, a multiple of switching transistors each having gating electrodes and a pair of switch contact electrodes, one switch electrode of each of said transistors being connected in common to output terminals and the other switch electrodes being connected individually to said sector couples, a multiple of selecting transistors each having base, collector and emitter electrodes, circuitry interconnecting said collector electrodes individually to said gating electrodes of said switching transistors, peak clamping circuits individually coupled to said sector couples and having output terminals, peak storing circuits individually connected between said output terminals of said clamping circuits and the base electrode of the selecting transistor associated with the switching transistor connected to the same sector couple, and energizing circuitry connected in common to said emitter electrodes, whereby that selecting transistor having the highest light value is rendered conducting for closing the switch contact electrodes of the associated switching transistor.

18. Optical bar coding scanning apparatus as defined in claim 17 and wherein said interconnecting circuitry is electric level shifting circuitry.

19. Optical bar coding scanning apparatus as defined in claim 17 and wherein capacitors are interposed in the coupling of said sector couples and said clamping circuits.

20. Optical bar coding scanning apparatus as defined in claim 1 and incorporating a mark detector circuit comprising a pair of unilateral impedance devices having opposite electrodes connected in common to said sector couples, a pair of capacitors connected in common to a point of reference potential and connected individually to the other electrodes of said unilateral impedance devices, a pair of isolating circuits having input terminals connected individually to said other electrodes of said unilateral impedance devices and having output terminals, a pair of resistance components connected in series to said output terminals of said isolating circuits, and a differential amplifying circuit having one input terminal connected to the junction between said resistance components, another input terminal connected to said common connected electrodes of said unilateral impedance devices, and having output terminals.

21. Optical bar coding scanning apparatus as defined in claim 20 and wherein said isolating circuits are amplifying circuits.

22. Optical bar coding scanning apparatus as defined in claim 20 and wherein said resistance components are of substantially equal resistance value.

23. Optical bar coding scanning apparatus as defined in claim 3 and incorporating an electronic summing circuit having two input terminals and output terminals, connections between one of said input terminals and said center section, a multiplex selector switching circuit having a multiple of separate circuit terminals and a common terminal connected to said other input terminal of said summing circuit, and connections individual to said couples of sectors and said separate terminals of said switching circuit.

24. Optical bar coding scanning apparatus for recovering information encoded in a series of elongated parallel bars laid down on a document in contrasting characteristic to that of said document, comprising an optical system comprising a source of light arranged for illuminating at least a part of said document, a photosensitive device arranged for receiving at least a portion of said light reflected from said document being scanned, and an elongated optical aperture stop arranged in the optical path between the ends thereof defined by said light source and said photosensitive device and defining an elongated pupil at said document, said photoresponsive device comprising a sectored light wavelength responsive device of which the configuration of diametrically colinear sectors thereof constitutes said optical aperture stop, and electric circuitry coupled to said photoresponsive device and arranged for connecting at least one couple of colinear sectors effectively for phasing said aperture stop in substantial alignment with said bars for sensing the light reflected from said bars and background of said document of said contrasting characteristics.

25. Optical bar coding scanning apparatus as defined in claim 23 and wherein said electric circuitry is arranged for imparting effective rotation of said pupil about the center thereof at said document by connecting the couples of said photo device sequentially.

26. Optical bar coding scanning apparatus for recovering information encoded in a series of elongated parallel bars laid down on a document in contrasting characteristic to that of said document, comprising a photosensitive device arranged for receiving light from said document being scanned, said photosensitive device having a configuration of a multiple of photosensitive sectors insulated from each other and having longitudinal axes radiating outwardly from the center of said device at relatively small angles with respect to contiguous sectors, electronic circuitry connected to said sectors in couples comprising diametrically colinear sectors for generating electric levels proportional to the light received, an electronic summing circuit having input terminals and output terminals, a multiplex selector switching circuit having a multiple of separate circuit terminals and a common terminal connected to said input terminals of said summing circuit, connections individual to said couples of sectors and said separate terminals of said switching circuit, a mark detector circuit having positive and negative peak storing circuits coupled to said sector couples, comparator circuits individually coupled to said sector couples and to one of said peak storing circuits and having output terminals at which levels are presented indicating over or under the level of said one peak storing circuit, an OR gating circuit having input circuitry coupled to all of said comparator circuits and having an output lead, a transistor having a base electrode connected to said output lead, a collector electrode connected in circuit with a load element and an emitter electrode, a current source transistor having a collector electrode connected to said base electrode of the first said transistor, a base electrode connected to the emitter electrode of said first transistor, and having an emitter electrode connected to a current sink element, and circuitry for applying energizing potentials to said transistors for maintaining said first transistor nonconducting with less than two of said comparators at levels under or over said peak storing circuit level.

27. Optical bar coding scanning apparatus as defined in claim 25 and wherein said comparator circuits are differential amplyfying circuits.

28. Optical bar coding scanning apparatus for recovering information encoded in a series of elongated parallel bars laid down on a document in contrasting characteristic to that of said document, comprising a photosensitive device arranged for receiving light from said document being scanned, said photosensitive device having a configuration of a multiple of photosensitive sectors insulated from each other and having longitudinal axes radiating outwardly from the center of said device at relatively small angles with respect to contiguous sectors, electronic circuitry connected to said sectors in couples comprising diametrically colinear sectors for generating electric levels proportional to the light received.

A photosensitive section insulated from said sectors and interposed therebetween at said center, connections from said section to said electronic circuitry for increasing the effective area of said couples, an electronic summing circuit having two input terminals and ouput terminals, connections between one of said input terminals and said center section, a multiplex selector switching circuit having a multiple of separate circuit terminals and a common terminal connected to said other input terminal of said summing circuit, connections individual to said couples of sectors and said separate terminals of said switching circuit, a pair of level triggering bistatic output level electronic circuits having input terminals coupled individually to the output terminal of said electronic summing circuit and to said photosensitive section and having pairs of output terminals at which levels appear corresponding to determinations of light or dark levels, and an OR gating circuit having input terminals connected individually to like terminals of said bistatic output level circuits and having output terminals.

29. Optical bar coding scanning apparatus for recovering information encoded in a series of elongated parallel bars laid down on a document in contrasting characteristic to that of said document, comprising a photosensitive device having an even number of separate photosensitive sectors radiating from a central point section and connected in a multiple of diametrically collinear sector-couples, a multiplex switching circuit having taps individually connected to said sector-couples and output terminals a summing circuit having input terminals connected to said output terminals of said multiplex switching circuit and having output terminals, a mark-space detecting circuit having at least one component charge storage circuit connected to the output terminals of said summing circuit and having output terminals at which signal levels indicative of mark and space are delivered, a comparing voltage generating circuit connected to said component charge storage circuit and having output terminals at which a level indicative of the output of said one sector-couple is presented, a multiple of comparator circuits individually connected to said sector-couples and connected in common to said output terminals of said comparing voltage generating circuit and having output terminals at which are delivered one of two levels indicative of that sector-couple associated with the comparator circuit under consideration, being in better alignment with said bars on said document than in said one sector couple and electronic circuitry connected to said comparator circuits and to said multiplex switching circuit for stepping the latter to select that sector-couple having a response greater than that of said one sector-couple.

30. Optical bar coding scanning apparatus as defined in claim 29 and incorporating circuitry interposed in the input circuitry of said summing circuit and said comparing voltage generating circuitry for introducing an off-set voltage.

31. Optical bar coding scanning apparatus as defined in claim 29 and wherein said electronic circuitry comprises a detector circuit connected to the output terminals of said comparator circuits for determining that no more than one comparator circuit is at the level indicating better alignment with said bars on said document of the associated sector-couple than that of said one sector-couple.

32. Optical bar coding scanning apparatus as defined in claim 31 and wherein said detector circuit comprises an OR gating circuit having one input line to each of said comparator circuits and an output line, an AND gating circuit having an input line connected to the output line of said OR gating circuit, at least one other input line and an output terminal, and a plurality detector circuit having one input line to each of said comparator circuits and an output line connected to said other input line of said AND gating circuit, said plurality detector circuit being arranged for disabling said AND gating circuit on the presence of two comparator circuits having outputs at said one level.

33. Optical bar coding scanning apparatus as defined in claim 32 and wherein said electronic circuitry further comprises address encoding circuitry having input lines individually connected to the output terminals of said comparator circuits and having output terminals, a select address register having input terminals and output terminals, an address decoding circuit connected to the output terminals of said register and to said multiplex switching circuit, an address loading gating circuit interconnecting the output terminals of said address encoding circuit and the input terminals of said register and having enabling terminals coupled to said output line of said AND gating circuit.

34. Optical bar coding scanning apparatus as defined in claim 33 and incorporating a loading monostable reciproconductive circuit interposed between said detector circuit and said address loading gating circuit.

35. Optical bar coding scanning apparatus as defined in claim 34 and incorporating a bilateral reciproconductive circuit having a set terminal connected to the operating terminal of said monostable circuit, a reset terminal, a set state terminal and an idling state terminal connected to a further input line to said AND gating circuit.

36. Optical bar coding scanning apparatus as defined in claim 35 and incorporating a reset reciproconductive circuit connected between the idling terminal of said loading monostable circuit and said reset terminal of said bilateral circuit.

37. Optical bar coding scanning apparatus as defined in claim 29 and incorporating sample-and-hold circuitry interposed between said summing circuit and said mark detecting circuit and having a hold control line connected to the set state terminal of said bilateral circuit for obviating the effect of any transient voltages during address loading and switching.

38. Optical bar coding scanning apparatus as defined in claim 36 and wherein said electronic circuitry further comprises a pair of data selector circuits each having input lines individually connected to said output terminals of said comparator circuits in given order with like terminals staggered by a factor of two terminals, address input lines connected to said select address register, and having output terminals internally connected in accordance with the address on said address input lines individually to those comparators one address on either side of that sector-couple under consideration, said select address register further having individual address lines for incrementing by one address and for decrementing by one address, and a slope detecting circuit coupled to said summing circuit and having output terminals gating circuitry having selecting input lines individually connected to the output terminals of said data selector circuits, output lines connected individually to the individual address lines of said address select register, and gating lines coupled to said mark-space detecting circuit and to said slope detecting circuit for strobing said data selector circuits and selecting an adjacent sector-couple in the event that such sector-couple is indicated to be more nearly aligned with the marks on said document than said sector-couple under consideration.

39. Optical bar coding scanning apparatus as defined in claim 36 and incorporating detecting circuitry in said electronic circuitry coupled to said summing circuit and to said select address register for switching said multiplex switching circuit on the rate-of-rise of the output of said summing circuit.

40. Optical bar coding scanning apparatus for recovering information encoded in a series of elongated parallel bars laid down on a document in contrasting characteristic to that of said document, comprising a photosensitive device having a central photosensitive section and an even number of separate photosensitive sectors radiating from said central section and connected in a multiple of diametrically collinear sector-couples, a multiplex switching circuit having taps individually connected to said sector-couples and having switching terminals and output terminals a summing circuit having input terminals connected to said output terminals of said multiplex switching circuit and to said central photosensitive section and having output terminals, a sample-and-hold circuit connected to the output terminals of said summing circuit and a mark-space detecting circuit having at least one component charge storage circuit connected to said sample-and-hold circuit and having output terminals at which signal levels indicative of mark and space are delivered, a slope detecting circuit connected to the input of said mark-space detecting circuit and having output terminals, a resetting reciproconductive circuit connected to said slope detecting circuit and to said component charge storing circuit in said mark-space detecting circuit for discharging the charge, a comparing circuit having one input line connected to said summing circuit and another input line connected to said sample-and-hold circuit for comparing the rate-of-rise of the waveforms thereat and having output terminals, a multiplex address counter, a timing wave generator connected to said counter for stepping the same, a quadruplex timing wave divider connected to said counter for dividing each step of the latter, a multiplex address decoder connected to said counter, a select address gating circuit connected to said counter, a select address register connected to said select address gating circuit and having address lines arranged for incrementing and decrementing addresses, an address comparing circuit connected to said multiplex address counter and to said multiplex switching circuit and having a compare output line, gating circuitry having a selecting input line connected to the address compare line of said address comparing circuit, output lines connected individually to the individual address lines of said address select register, and gating lines coupled to said mark-space detecting circuit and to said slope detecting circuit for serially strobing said sector-couples and selecting that sector-couple indicated to be most nearly aligned with the marks on said document.

41. Optical bar coding scanning apparatus as defined in claim 1 and wherein said electronic circuitry comprises a sector-coupled alignment detector circuit connected to all sector-couples, and a sector-couple selecting switch circuit connected to all sector-couples and to said sector-couple alignment circuit and having output terminals, said switch circuit being arranged for sequentially connecting said sector-couples to said detector circuit for determining the best aligned sector-couple and for connecting that sector-couple to said output terminals in response to said detector circuit.

42. Optical bar coding scanning apparatus as defined in claim 39 and wherein said detecting circuitry includes peak predicting circuitry comprising a binary up-down counting circuit having count-up input terminals, count-down input terminals, reset terminals, and at least one output terminal at the high order bit stage, a source of electric timing pulses, a gating circuit having timing pulse terminals connected to said source of timing pulses, enabling terminals, and counting direction terminals, a direction latching reciproconductive circuit having output terminals connected individually to said counting direction terminals of said counting circuit, set terminals and reset terminals for changing count direction, an enabling bilateral reciproconductive circuit having output terminals connected to said enabling terminals of said gating circuit, set terminals connected to the set terminals of said direction latching circuit and to the resetting terminals of said binary counting circuit, and reset terminals connected to said one output terminal of said binary counting circuit for disabling the counting, means for applying a timing pulse to said set terminals of said reciproconductive circuits for initiating a count-up operation, and means for applying mark signal to said reset terminals of said latching circuit for reversing the counting in said counting circuit at a change in said mark signals signifying substantially the half-time period prior to the predicted peak.

43. Optical bar coding scanning apparatus as defined in claim 29 and wherein said electronic circuitry comprises a priority encoding circuit having input terminals individually connected to the output terminals of said comparator circuits, address line terminals, and an "any selected" output terminals, said priority encoding circuit being arranged to present voltages on said address line terminals indicative of the address of the highest order comparator circuit indicating greater output of a sector-couple than that of said selected sector-couple and a voltage of said "any selected" output terminal indicative of at least one such comparator circuit, a select address register having input terminals and output terminals, an address decoding circuit connected to the output terminals of said register and to said multiplex switching circuit, an address loading gating circuit interconnecting the address line terminals of said priority encoding circuit and the input terminals of said register and having enabling terminals coupled to said "any selected" output terminal, thereby to step said circuitry until the one sector-couple of highest output is selected.

* * * * *